United States Patent [19]

Bohen et al.

[11] Patent Number: 5,081,169

[45] Date of Patent: Jan. 14, 1992

[54] ORGANIC SULFIDE STABILIZED POLYMERIC ENGINEERING RESINS

[75] Inventors: Joseph M. Bohen, King of Prussia; James L. Reilly, Towamencin, both of Pa.

[73] Assignee: Atochem North America, Inc., Philadelphia, Pa.

[21] Appl. No.: 429,883

[22] Filed: Oct. 31, 1989

[51] Int. Cl.$^5$ .............................................. C08K 5/37
[52] U.S. Cl. ............................... 524/58; 106/169; 106/176; 106/188; 524/111; 524/368; 524/376; 524/377; 524/392
[58] Field of Search ............... 524/377, 376, 368, 392, 524/58, 111, 91, 255, 337; 106/188, 169, 176

[56] References Cited

U.S. PATENT DOCUMENTS

| | | | |
|---|---|---|---|
| T985,004 | 8/1979 | Paul | 260/45.7 S |
| 2,522,590 | 9/1950 | Vaughan et al. | 204/158 |
| 2,995,539 | 8/1961 | Barker et al. | 260/45.5 |
| 3,180,850 | 4/1965 | Schooten et al. | 524/324 |
| 3,223,738 | 12/1965 | Crain et al. | 524/392 |
| 3,258,493 | 6/1966 | Braus et al. | 568/57 |
| 3,293,209 | 12/1966 | Baldwin et al. | 524/333 |
| 3,301,816 | 1/1967 | Burgess | 260/15.95 |
| 3,305,520 | 2/1967 | Fritz | 524/151 |
| 3,361,713 | 1/1968 | Meyer | 525/345 |
| 3,574,165 | 4/1971 | Braus et al. | 524/326 |
| 3,594,448 | 7/1971 | Birenzvige et al. | 260/857 |
| 3,640,948 | 2/1972 | Jackson | 260/45.75 |
| 3,652,680 | 3/1972 | Buchholz | 524/326 |
| 3,772,246 | 11/1973 | Buchholz | 524/392 |
| 3,772,390 | 11/1973 | Song | 260/609 |
| 3,773,723 | 11/1973 | Cole | 260/45.85 |
| 3,876,613 | 4/1975 | Needham et al. | 524/289 |
| 3,932,353 | 1/1976 | Mastrolla et al. | 260/45.75 |
| 3,952,072 | 4/1976 | Yonemitsu et al. | 260/874 |
| 3,985,705 | 10/1976 | Georgoudis | 260/45.8 |
| 3,988,378 | 10/1976 | Wirth et al. | 260/609 |
| 4,021,468 | 5/1977 | Lind | 260/470 |
| 4,028,332 | 6/1977 | Needham et al. | 524/303 |
| 4,059,570 | 11/1977 | Oswald | 260/77.5 |
| 4,134,879 | 1/1979 | Schmidt | 260/45.85 |
| 4,220,805 | 9/1980 | Carnahan | 568/592 |
| 4,221,699 | 9/1980 | Arnaud et al. | 524/333 |
| 4,255,321 | 3/1981 | Brussen | 260/45.75 |
| 4,273,942 | 6/1981 | Mark et al. | 568/42 |
| 4,279,805 | 7/1981 | Ohzeki et al. | 260/45.9 |
| 4,330,462 | 5/1982 | Keck et al. | 524/331 |
| 4,362,830 | 12/1982 | Minagawa et al. | 524/101 |
| 4,474,914 | 10/1984 | Spivack | 524/100 |
| 4,514,539 | 4/1985 | Hattrich et al. | 524/436 |
| 4,526,916 | 7/1985 | White | 524/130 |
| 4,536,522 | 8/1985 | Gigsby, Jr. et al. | 521/172 |
| 4,560,799 | 12/1985 | Spivack et al. | 568/47 |
| 4,611,023 | 9/1986 | Spivak et al. | 524/326 |
| 4,612,341 | 9/1986 | Spivack et al. | 524/331 |
| 4,659,762 | 4/1987 | Jenkins | 524/331 |
| 4,670,495 | 6/1987 | Evans | 524/155 |
| 4,699,972 | 10/1987 | Hammer et al. | 528/293 |
| 4,904,717 | 2/1990 | Ho et al. | 524/392 |

FOREIGN PATENT DOCUMENTS

| | | |
|---|---|---|
| 0177784 | 4/1986 | European Pat. Off. . |
| 1265409 | 4/1968 | Fed. Rep. of Germany . |
| 1694210 | 4/1971 | Fed. Rep. of Germany . |
| 981346 | 3/1963 | United Kingdom . |
| 1015797 | 7/1964 | United Kingdom . |
| 966929 | 8/1964 | United Kingdom . |

OTHER PUBLICATIONS

Kirk–Othmer's Encyclopedia of Polymer Science and Engineering, 2nd Edition, vol. 6, pp. 94–129.
The Condensed Chemical Dictionary, 10th Ed., p. 821 (1981).

*Primary Examiner*—Veronica P. Hoke
*Attorney, Agent, or Firm*—Finnegan, Henderson, Farabow, Garrett & Dunner

[57] ABSTRACT

The present invention is directed to a composition comprising a polymeric engineering resin selected from the group consisting of polycarbonates, polyarylethers, polyamides, polyesters, polyacetals, polyaryl sulfides, cellulose esters and styrene copolymers; and an amount of an organic sulfide antioxidant sufficient to stabilize the resin against oxidative or thermal degradation during processing and use, the organic sulfide antioxidant being represented by Formula I, II, or III:

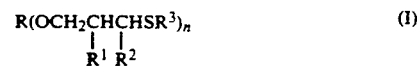

(I)

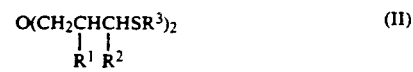

(II)

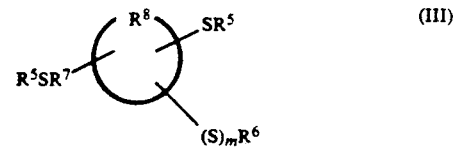

(III)

wherein m, n, R, R$^1$, R$^2$, R$^3$, R$^5$, R$^6$, R$^7$ and R$^8$ are as set forth in the Summary of the Invention.

56 Claims, No Drawings

ORGANIC SULFIDE STABILIZED POLYMERIC ENGINEERING RESINS

FIELD OF THE INVENTION

The present invention relates to polymeric resins stabilized with organic sulfide antioxidants. More particularly, the present invention is directed to the stabilization of high temperature engineering polymeric resins with organic sulfide antioxidants.

BACKGROUND OF THE INVENTION

In general, all plastics have a tendency to degrade and deteriorate, particularly when exposed to air or oxygen at elevated temperatures. This combination of high temperatures and the presence of oxygen causes the oxidation of the plastic material. Upon oxidation, plastics tend to become discolored and brittle, causing them to lose much of their commercial value.

In recent years, the plastics industry has sought to develop resins which may be used for a variety of high temperature applications. Such resins which may be used at high temperatures are often referred to as "engineering resins" (see, e.g., *Kirk-Othmer's Encyclopedia of Polymer Science and Engineering*, Second Edition, Volume 6, pages 94-129; *The Condensed Chemical Dictionary*, page 821). These resins may be substituted for metals in many engineering applications, since they are capable of sustaining high loads and stresses, machinable and dimensionally stable. Such engineering resins may be used in a variety of applications, such as parts for electrical motors, automotive components, etc. Engineering resins also generally require higher processing temperatures and are used in applications wherein resistance to high temperatures over long periods of time is essential.

In order to protect these engineering resins from the deleterious effects of high temperature and oxygen, two methods have been developed in the art. The first method comprises the development of new resins which are inherently more stable to higher temperatures. The second method involves the development of polymer formulations containing additives which stabilize the resin to the effects of oxygen and high temperatures. The second method has proven to be much more cost effective than the first and consequently has generally been the subject of more attention and research.

A wide variety of stabilizing additives are conventional in the art. The effectiveness of these additives depends upon the types of resin used, the temperatures to which the resin is subjected, the duration of such exposure, etc. For example, conventional stabilizers include phenols, organic phosphites and sulfides.

The phenols and organic phosphites, although more general in their utility, have demonstrated many problems. For example, high performance and high molecular weight phenols and phosphites are quite expensive, whereas the lower cost and lower molecular weight phenols and phosphites, although more cost effective to use, are more volatile and tend to be lost by vaporization at high processing temperatures. Phenol stabilizers tend to form colored impurities at high temperatures and when exposed to light, while organic phosphite stabilizers hydrolyze readily in the presence of moisture. Moreover, most phosphite stabilizers are ineffective as long-term heat stabilizers and are used normally only as processing stabilizers, i.e., in order to protect the resin from high temperatures for a short period of time (e.g., during extrusion and injection molding). The phenols and organic phosphite stabilizers contain reactive groups, such as esters and amides which may react with moisture, particularly at high temperatures.

The known organic sulfide stabilizers are only usable in polyolefins and styrenic copolymers as long-term heat stabilizers. A long-term heat stabilizer is an additive which protects the resin only after the manufacturing steps, i.e., during its service life. The conventional organic sulfides do not protect plastics and polymerics during high temperature processing or manufacturing steps and therefore, are ineffective for use in high temperature engineering resins. Moreover, organic sulfides, especially the thiodipropionates, often decompose at high temperatures emitting foul-smelling gases and generating colored impurities.

Examples of conventional organic sulfide stabilizers are disclosed in U.S. Pat. Nos. 3,652,680 and 3,772,246, which are incorporated herein by reference. Both of these references discuss the use of cycloalkane bis(alkyl sulfides) as antioxidants in polyolefins. European Patent Application Pulbication No. 177784, published Apr. 16, 1986, also discloses the use of cycloalkane bis(alkyl sulfides) as ultraviolet light stabilizers in polyolefins. However, the problem of stabilizing high temperature engineering-type resins to the degradative effects of oxygen and high temperatures has not been heretofore addressed.

Accordingly, it can be seen that there is a need for polymeric compositions containing engineering resins which are effectively stabilized from the adverse effects of oxygen and high temperatures through the addition of protective antioxidants. Ideally, antioxidants used to protect engineering resins should stabilize the resin against the effects of both high temperatures and oxygen during processing and should also protect the finished article during use. Moreover, the antioxidants should be thermally stable, so that the composition can endure the high temperature processing which engineering resins are subjected to. Moreover, the antioxidants should be chemically inert to water and a wide variety of fillers and reinforcing agents which are conventionally compounded with such resins.

An object of the present invention is to provide a resin blend comprising engineering resins and antioxidants which will protect the resins from the deleterious effects of oxygen and high temperatures both during processing and use. A further object of this invention is to provide antioxidants which may be used to stabilize engineering resins and which themselves are stable and inert to the effects of high temperature, water and chemicals.

SUMMARY OF THE INVENTION

The present invention is directed to a composition comprising a polymeric engineering resin selected from the group consisting of polycarbonates, polyarylethers, polyamides, polyesters, polyacetals, polyaryl sulfides, cellulose esters and styrene copolymers; and an amount of an organic sulfide antioxidant sufficient to stabilize the resin against oxidative or thermal degradation during processing and use, the organic sulfide antioxidant being represented by Formula I, II, or III:

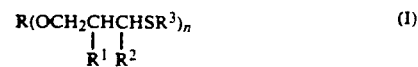

$$O(CH_2CHCHSR^3)_2 \quad \text{(II)}$$
$$\quad \;\; | \quad |$$
$$\quad \;\; R^1 \; R^2$$

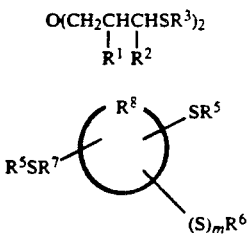

wherein:

m is 0 or 1;

n is an integer of 2 to 15;

R is a substituted or unsubstituted alkyl group of 2 to 30 carbons, a substituted or unsubstituted cycloalkyl group of 5 to 20 carbons, a substituted or unsubstituted alkyl group of 2 to 30 carbons where any of up to 6 carbon atoms are replaced with an O or S heteroatom, a substituted or unsubstituted cycloalkyl group of 5 to 20 carbons where any of up to 6 carbon atoms are replaced with an O or S heteroatom, with the proviso that the heteroatoms must be separated from each other and from the portion of the compound to which the R group is bonded by at least one carbon atom, the substituents for R being —OH, —SR$^4$ or —OR$^4$, wherein R$^4$ is an alkyl group of 1 to 30 carbons or a cycloalkyl group of 5 to 20 carbons;

R$^1$ and R$^2$ are independently H or an alkyl group of 1 to 4 carbons;

R$^3$ is an alkyl group of 1 to 24 carbons or a cycloalkyl group of 5 to 20 carbons;

R$^5$ is an alkyl group of 1 to 24 carbons;

R$^6$ is H or an alkyl group of 1 to 24 carbons, with the provisos that when m=0, R$^6$ is H or an alkyl group of 1 to 7 carbons and when m=1, R$^6$ is alkyl group of 1 to 24 carbons;

R$^7$ is a direct bond or an alkylene group of 1 to 4 carbons; and

R$^8$ is a monocyclic, bicyclic or tricyclic cycloalkyl group of 5 to 16 carbons.

DETAILED DESCRIPTION OF THE PREFERRED EMBODIMENTS

The present inventors have discovered that a certain class of organic sulfides provide stabilizer, i.e., antioxidant, activity in a wide variety of high temperature engineering polymer resins when incorporated therein. When the organic sulfide antioxidants of the present invention are used, either alone or in combination with primary antioxidants, they protect the engineering resins from the deleterious effects of oxidation and thermal degradation. The present organic sulfides stabilize the polymeric engineering resins both during processing and during use.

The present invention comprise polymeric engineering resins stabilized with organic sulfide antioxidants represented by Formula I, II or III set forth below:

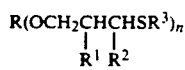

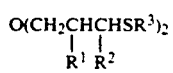

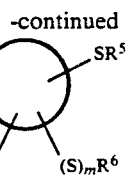

wherein:

m is 0 or 1;

n is an integer of 2 to 15;

R is a substituted or unsubstituted alkyl group of 2 to 30 carbons, a substituted or unsubstituted cycloalkyl group of 5 to 20 carbons, a substituted or unsubstituted alkyl group of 2 to 30 carbons where any of up to 6 carbon atoms are replaced with an O or S heteroatom, a substituted or unsubstituted cycloalkyl group of 5 to 20 carbons where any of up to 6 carbon atoms are replaced with an O or S heteroatom, with the proviso that the heteroatoms must be separated from each other and from the portion of the compound to which the R group is bonded by at least one carbon atom, the substituents for R being —OH, —SR$^4$ or —OR$^4$, wherein R$^4$ is an alkyl group of 1 to 30 carbons or a cycloalkyl group of 5 to 20 carbons;

R$^1$ and R$^2$ are independently H or an alkyl group of 1 to 4 carbons;

R$^3$ is an alkyl group of 1 to 24 carbons or a cycloalkyl group of 5 to 20 carbons;

R$^5$ is an alkyl group of 1 to 24 carbons;

R$^6$ is H or an alkyl group of 1 to 24 carbons, with the provisos that when m=0, R$^6$ is H or an alkyl group of 1 to 7 carbons and when m=1, R$^6$ is alkyl group of 1 to 24 carbons;

R$^7$ is a direct bond or an alkylene group of 1 to 4 carbons; and

R$^8$ is a monocyclic, bicyclic or tricyclic cycloalkyl group of 5 to 16 carbons.

The preparation of several of the above-described organic sulfides and their use in other applications are disclosed in U.S. Pat. Nos. 3,652,680 and 3,772,246 to Bucholz, the disclosure of which is incorporated herein by reference.

Preferably, the organic sulfide antioxidants of the present invention are those represented by Formulas I or II, wherein R is:

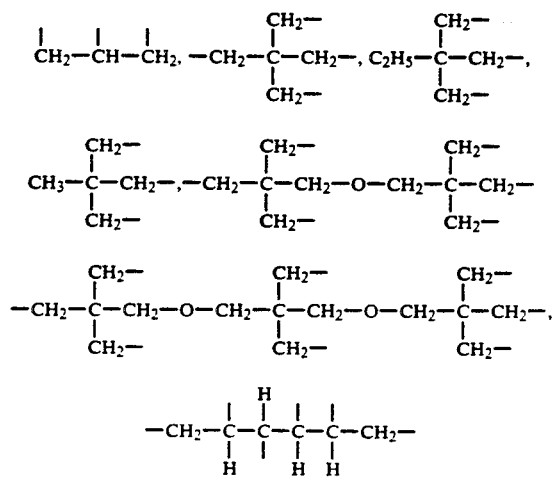

-continued

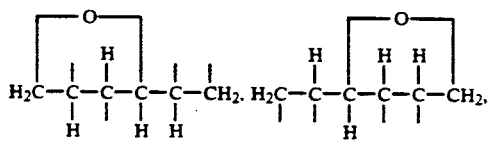

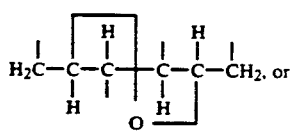

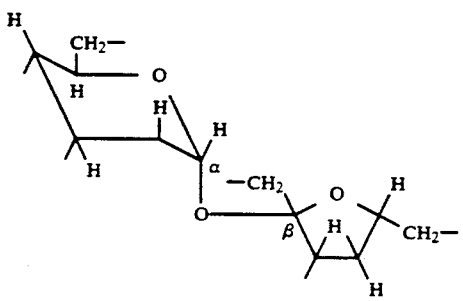

(wherein ∝ and β are the types of linkages) wherein:
R$^1$ is H or CH$_3$;
R$^2$ is H; and
R$^3$ is an alkyl group of 10 to 18 carbons.

More preferred are the organic sulfide antioxidants represented by Formulas I or II, wherein R is represented by:

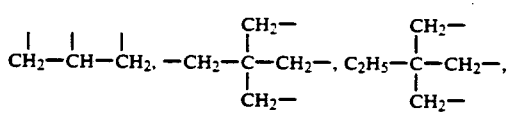

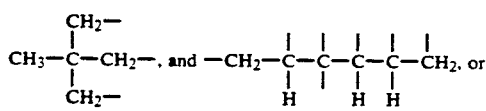

wherein:
R$^1$ and R$^2$ are H; and
R$^3$ is an alkyl group of 12 to 18 carbons.

Organic sulfide antioxidants represented by Formula III are preferably those of the following structures:

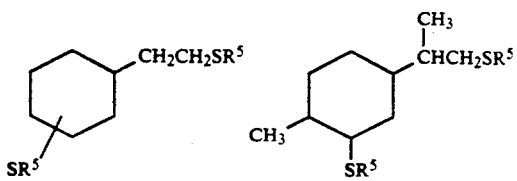

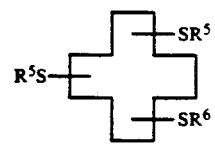

In the preferred and more preferred organic sulfide antioxidants set forth above, the value of n is determined by the number of unattached bonds in each R group.

Non-limiting examples of preferred organic sulfide antioxidants useful in the present compositions include, 2,9-bis(octadecylthio)-p-menthane; beta(alkylthio)ethyl-3-(alkylthio)-cyclohexane; beta(n-octadecylthio)ethyl-3-(n-octadecylthio)cyclohecane, beta-(n-octadecylthio)-ethyl-4(n-octadecylthio)cyclohexane, which are all usually prepared as a mixture of isomers and referred to hereinafter as "beta(n-alkylthio)-ethyl-3 and 4-(alkylthio)cyclohexane" and equivalent terms; 1,5,9 tris(hexadecylthio)-cyclododecane, 1,5,8 tris(hexadecylthio)-cyclododecane, 1,4,8 tris(hexadecylthio)-cyclododecane, which are usually prepared as a mixture of isomers and referred to hereinafter as "1,4 (or 5), 8 (or 9) tris(-hexadecylthio)-cyclododecane" and equivalent terms; 2,9-bis (alkylthio)-p-menthane; 3,3'-bis (alkylthiopropyl) ether, 1,4,8-tris(alkylthio)cyclododecane, 1,5,8-tris-(alkylthio)cyclododecane, and 1,5,9,-tris(alkylthio)cyclodocecane, which are all usually prepared as a mixture of isomers and referred to hereinafter as "1,4 (or 5),8 (or 9)-tris(alkylthio)cyclododecane" and equivalent terms; pentaerythritol tetrakis(n-ocatadecylthiopropyl) ether; pentaerythritol tris (n-octdecylthiopropyl) ether; pentaerythritol tetrakis (n-dodecyltrhiopropyl) ether; pentaerythritoltris(n-dodecylthiopropyl) ether; trimethylolpropane tris (n-octadecylthiopropyl) ether; trimethylolpropane tris (n-hexyldecylthiopropyl ether; dipentaerythritol hexakis(n-octaylthiopropyl) ether; dipentaerythritol hexakis (n-dodecylthio-propyl)ether; dipentaerythritol hexakis (n-hexyldecylthiopropyl) ether. The alkylthio group in each of the above classes of compounds contains about 2 to about 38 carbons and preferably, about 8 to about 20 carbons.

Non-limiting examples of representative organic sulfides useful in practicing the present invention are set forth below.

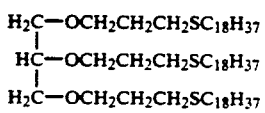

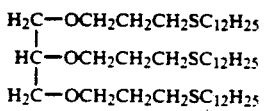

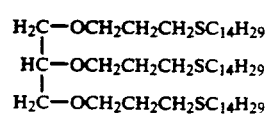

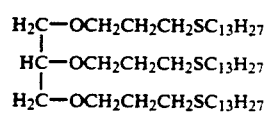

```
H2C—OCH2CH2CH2SC16H33
HC—OCH2CH2CH2SC16H33
H2C—OCH2CH2CH2SC16H33

H2C—OCH2CH2CH2SC9H19
HC—OCH2CH2CH2SC9H19
H2C—OCH2CH2CH2SC9H19

H2C—OCH2CH2CH2SC8H17
HC—OCH2CH2CH2SC8H17
H2C—OCH2CH2CH2SC8H17

H2C—OCH2CHCH2SC8H17
          |
          CH3
HC—OCH2CHCH2SC8H17
          |
          CH3
H2C—OCH2CHCH2SC8H17
          |
          CH3

H2C—OCH2CHCH2SC12H25
          |
          CH3
HC—OCH2CHCH2SC12H25
          |
          CH3
H2C—OCH2CHCH2SC12H25
          |
          CH3

H2C—OCH2CHCH2SC16H33
          |
          CH3
HC—OCH2CHCH2SC16H33
          |
          CH3
H2C—OCH2CHCH2SC16H33
          |
          CH3

H2C—OCH2CHCH2SC18H37
          |
          CH3
HC—OCH2CHCH2SC18H37
          |
          CH3
H2C—OCH2CHCH2SC18H37
          |
          CH3
```

-continued
```
H2C—OCH2CH2CH2SC17H35
HC—OCH2CH2CH2SC17H35
H2C—OCH2CH2CH2SC17H35

H2C—O—CH2CHCH2SC10H21
              |
              CH3
HC—O—CH2CHCH2SC10H21
              |
              CH3
H2C—O—CH2CHCH2SC10H21
              |
              CH3

H2C—OCH2CHCH2SC13H27
          |
          CH3
HC—OCH2CHCH2SC13H27
          |
          CH3
H2C—OCH2CHCH2SC13H27
          |
          CH3

H2C—OCH2CH2CHSC12H25
                |
                CH3
HC—OCH2CH2CHSC12H25
                |
                CH3
H2C—OCH2CH2CHSC12H25
                |
                CH3

H2C—OCH2CHCH2SC16H33
          |
          C3H7
HC—OCH2CHCH2SC16H33
          |
          C3H7
H2C—OCH2CHCH2SC16H33
          |
          C3H7

H2C—OCH2CH2CH2SC12H25
HC—OCH2CHCH2SC12H25
          |
          CH3
H2C—OCH2CH2CH2SC12H25

H2C—OCH2CHCH2SC16H33
          |
          CH3
HC—OCH2CH2CH2SC9H19
H2C—OCH2CH2CH2SC9H19

C(CH2OCH2CHCH2SC18H37)4
            |
            CH3
C(CH2OCH2CHCH2SC12H25)4
            |
            CH3
```

[structure: glycerol tri-ether with each chain ending in —OCH2CH2CH2S— attached to a cyclohexyl-S ring]

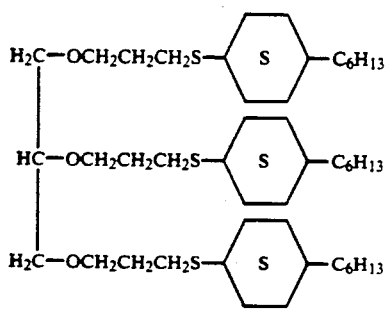

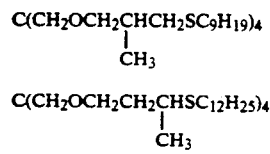

-continued

C(CH₂OCH₂CHCH₂SC₉H₁₉)₄
        |
        CH₃

C(CH₂OCH₂CH₂CHSC₁₂H₂₅)₄
          |
          CH₃

C(CH₂OCH₂CH₂CH₂SC₁₈H₃₇)₄
C(CH₂OCH₂CH₂CH₂SC₁₆H₃₃)₄

C(CH₂OCH₂CH₂CH₂SC₂₀H₄₁)₄
C(CH₂OCH₂CH₂CH₂SC₁₂H₂₅)₄

C(CH₂OCH₂CH₂CH₂SC₁₃H₂₇)₄
C(CH₂OCH₂CH₂CH₂SC₁₀H₂₁)₄

C(CH₂OCH₂CH₂CH₂SC₈H₁₇)₄
C(CH₂OCH₂CH₂CH₂SC₁₄H₂₉)₄

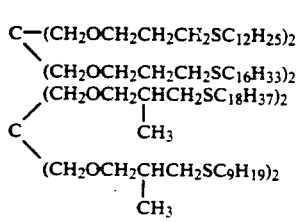

C(CH₂OCH₂CHSC₁₆H₃₃)₄
    |
    CH₃

C(CH₂OCH₂CH₂CHSC₁₀H₂₁)₄
       |
       CH₃

C(CH₂OCH₂CHCH₂SC₁₂H₂₅)₄
      |
      C₃H₇

C(CH₂OCH₂CHSC₁₈H₃₇)₄
    |
    C₄H₉

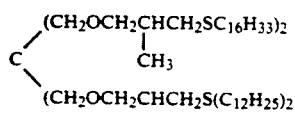

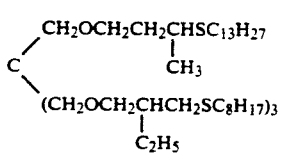

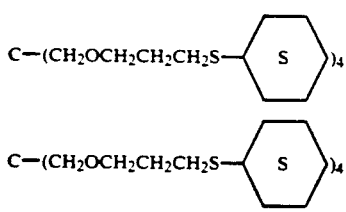

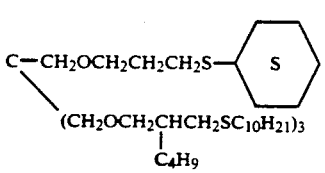

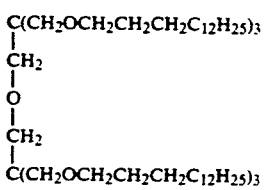

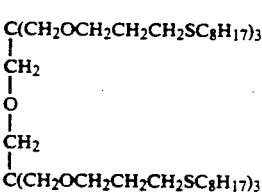

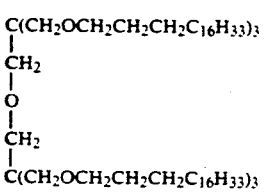

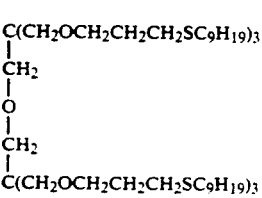

-continued
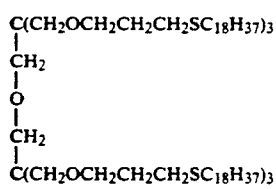
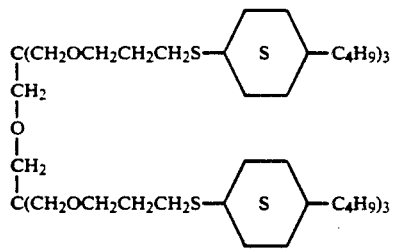
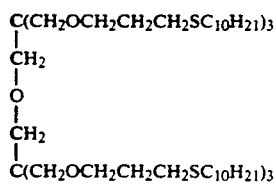
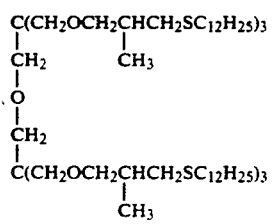
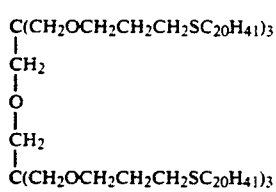
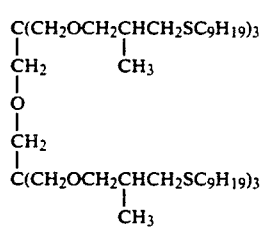
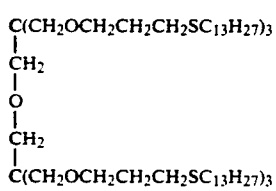
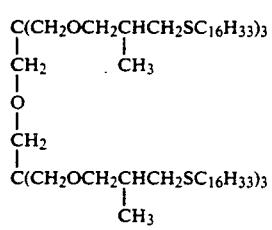
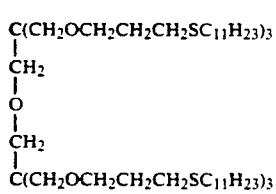
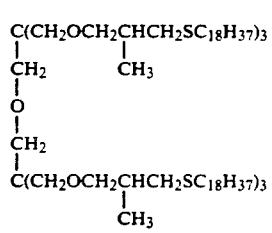
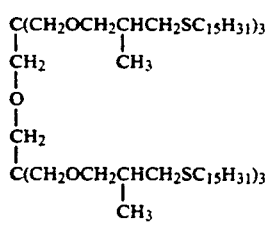
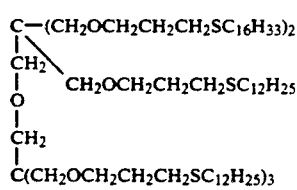
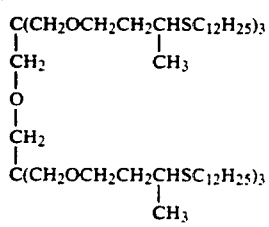
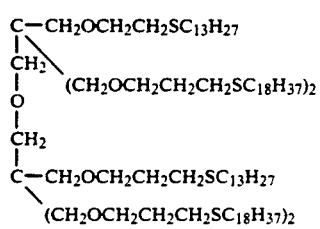

-continued

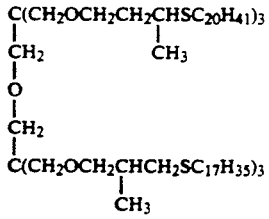
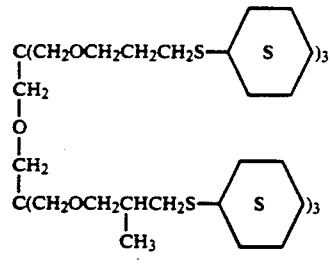

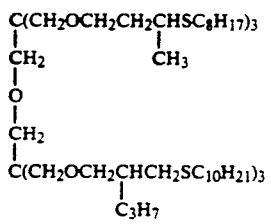
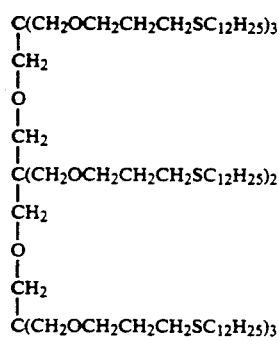

C₁₈H₃₇SCH₂CH₂CH₂O(CH₂CH₂O)₆CH₂CH₂OCH₂CH₂CH₂SC₁₈H₃₇

C₁₆H₃₃SCH₂CH₂CH₂O(CH₂CH₂SCH₂CH₂O)₂CH₂CH₂SCH₂CH₂OCH₂CH₂CH₂SC₁₆H₃₃

C₁₂H₂₅SCH₂CHCH₂O(CH₂CH₂O)₄CH₂CH₂OCH₂CHCH₂SC₁₂H₂₅
         |                              |
         CH₃                            CH₃

C₁₄H₂₉SCH₂CH₂CH₂OCH₂CH₂OCH₂CH₂OCH₂CH₂SCH₂CH₂OCH₂CH₂CH₂SC₁₄H₂₉

C₈H₁₇SCH₂CHCH₂OCH₂CH₂OCH₂OCH₂CH₂SCH₂CH₂OCH₂CHCH₂SC₈H₁₇
        |                                        |
        CH₃                                      CH₃

C₁₃H₂₇SCH₂CH₂CH₂O(CH₂CH₂CH₂CH₂O)₄CH₂CH₂CH₂CH₂OCH₂CH₂CH₂SC₁₃H₂₇

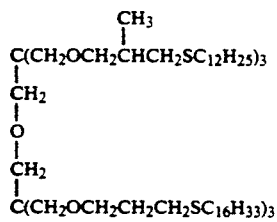
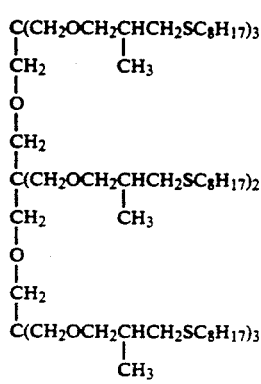

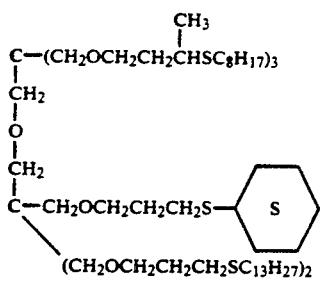

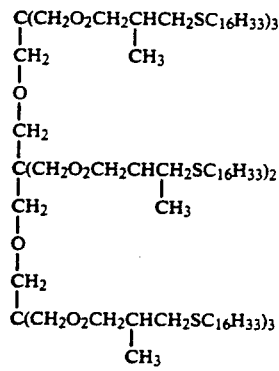

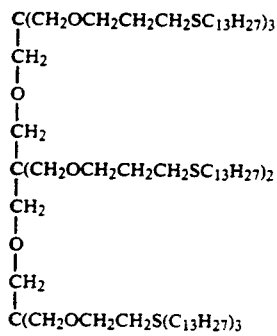

C₂H₅C(CH₂OCH₂CH₂CH₂SC₁₆H₃₃)₃
C₂H₅C(CH₂OCH₂CH₂CH₂SC₁₈H₃₇)₃
C₂H₅C(CH₂OCH₂CH₂CH₂SC₂₀H₄₁)₃
C₂H₅C(CH₂OCH₂CHCH₂SC₈H₁₇)₃
          |
          CH₃

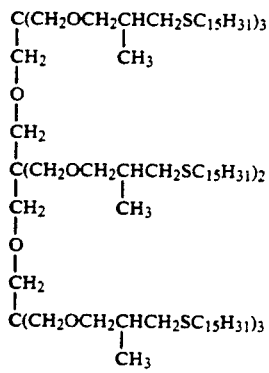

C₂H₅C(CH₂OCH₂CHCH₂SC₁₀H₂₁)₃
          |
          CH₃

C₂H₅C(CH₂OCH₂CHCH₂SC₁₂H₂₅)₃
          |
          CH₃

C₂H₅C(CH₂OCH₂CHCH₂SC₁₆H₃₃)₃
          |
          CH₃

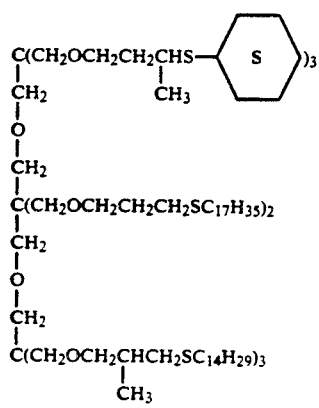

C₂H₅C(CH₂OCH₂CHCH₂SC₁₃H₂₇)₃
          |
          CH₃

C₂H₅C(CH₂OCH₂CHCH₂SC₁₈H₃₇)₃
          |
          CH₃

C₂H₅C(CH₂OCH₂CH₂CHSC₁₂H₂₅)₃
              |
              CH₃

C₂H₅—C(CH₂OCH₂CH₂CH₂SC₈H₁₇)₃

C₂H₅—C(CH₂OCH₂CH₂CHSC₉H₁₉)₃
              |
              CH₃

-continued $C_2H_5C(CH_2OCH_2CH_2CH_2SC_9H_{19})_3$ $C_2H_5C(CH_2OCH_2CH_2CH_2SC_{10}H_{21})_3$ $C_2H_5C(CH_2OCH_2CH_2CH_2SC_{13}H_{27})_3$ $C_2H_5C(CH_2OCH_2CH_2CH_2SC_{14}H_{29})_3$ $CH_3C(CH_2OCH_2CH_2CH_2SC_{10}H_{21})_3$
$CH_3C(CH_2OCH_2CH_2CH_2SC_9H_{17})_3$
$CH_3C(CH_2OCH_2CH_2CH_2SC_9H_{19})_3$
$CH_3C(CH_2OCH_2CH_2CH_2SC_{11}H_{23})_3$
$CH_3C(CH_2OCH_2CH_2CH_2SC_{12}H_{25})_3$
$CH_3C(CH_2OCH_2CH_2CH_2SC_{13}H_{27})_3$ $CH_3C(CH_2OCH_2CH_2CH_2SC_{14}H_{29})_3$
$CH_3C(CH_2OCH_2CH_2CH_2SC_{16}H_{33})_3$
$CH_3C(CH_2OCH_2CH_2CH_2SC_{19}H_{37})_3$
$CH_3C(CH_2OCH_2CH_2CH_2SC_{19}H_{39})_3$ $CH_3C(CH_2OCH_2\underset{CH_3}{CH}CH_2SC_8H_{17})_3$ $CH_3C(CH_2OCH_2\underset{CH_3}{CH}CH_2SC_{10}H_{21})_3$ $CH_3C(CH_2OCH_2\underset{CH_3}{CH}CH_2SC_{12}H_{25})_3$ $CH_3C(CH_2OCH_2\underset{CH_3}{CH}CH_2SC_{16}H_{33})_3$ $CH_3C(CH_2OCH_2\underset{CH_3}{CH}CH_2SC_{18}H_{37})_3$ $CH_3C(CH_2OCH_2CH_2\underset{CH_3}{CH}SC_{12}H_{25})_3$ $CH_3C(CH_2OCH_2CH_2\underset{CH_3}{CH}S\text{—}\boxed{S}\text{—}C_6H_{13})_3$ $\begin{array}{l}\phantom{C_8H_{17}SCH_2CH_2CH_2OCH}CH_2OCH_2CH_2CH_2SC_8H_{17}\\ \phantom{C_8H_{17}SCH_2CH_2CH_2OCH}HCOCH_2CH_2CH_2SC_8H_{17}\\ C_8H_{17}SCH_2CH_2CH_2OCH\\ \phantom{C_8H_{17}SCH_2CH_2CH_2OCH}HCOCH_2CH_2CH_2SC_8H_{17}\\ \phantom{C_8H_{17}SCH_2CH_2CH_2OCH}HCOCH_2CH_2CH_2SC_8H_{17}\\ \phantom{C_8H_{17}SCH_2CH_2CH_2OCH}CH_2OCH_2CH_2CH_2SC_8H_{17}\end{array}$ $C_2H_5C(CH_2OCH_2CH_2\underset{CH_3}{CH}S\text{—}\boxed{S})_3$ $C_2H_5C\underset{CH_2OCH_2CH_2CH_2SC_{16}H_{33}}{\text{—}(CH_2OCH_2CH_2CH_2SC_{12}H_{25})_2}$ $C_2H_5C\overset{(CH_2OCH_2\underset{C_4H_9}{CH}CH_2SC_8H_{17})_2}{\underset{CH_2OCH_2\underset{C_4H_9}{CH}CH_2SC_{10}H_{21}}{}}$ $CH_3C\underset{CHOCH_2\underset{CH_3}{CH}CH_2SC_{12}H_{25}}{\text{—}(CH_2OCH_2CH_2CH_2SC_{12}H_{25})_2}$ $CH_3C\overset{CH_2OCH_2CH_2CH_2SC_{10}H_{21}}{\underset{CH_2OCH_2CH_2CH_2SC_{16}H_{33}}{\text{—}CH_2OCH_2CH_2CH_2SC_{12}H_{25}}}$ $CH_3C(CH_2OCH_2\underset{C_3H_7}{CH}CH_2SC_{12}H_{25})_3$ $\begin{array}{l}\phantom{C_{12}H_{25}SCH_2CH_2CH_2O\text{—}CH}CH_2OCH_2CH_2CH_2SC_{12}H_{25}\\ \phantom{C_{12}H_{25}SCH_2CH_2CH_2O\text{—}CH}HCO\text{—}CH_2CH_2CH_2SC_{12}H_{25}\\ C_{12}H_{25}SCH_2CH_2CH_2O\text{—}CH\\ \phantom{C_{12}H_{25}SCH_2CH_2CH_2O\text{—}CH}HCO\text{—}CH_2CH_2CH_2SC_{12}H_{25}\\ \phantom{C_{12}H_{25}SCH_2CH_2CH_2O\text{—}CH}HCO\text{—}CH_2CH_2CH_2SC_{12}H_{25}\\ \phantom{C_{12}H_{25}SCH_2CH_2CH_2O\text{—}CH}CH_2OCH_2CH_2CH_2SC_{12}H_{25}\end{array}$ $\begin{array}{l}\phantom{C_{16}H_{33}SCH_2CH_2CH_2O\text{—}CH}CH_2OCH_2CH_2CH_2SC_{16}H_{33}\\ \phantom{C_{16}H_{33}SCH_2CH_2CH_2O\text{—}CH}HCO\text{—}CH_2CH_2CH_2SC_{16}H_{33}\\ C_{16}H_{33}SCH_2CH_2CH_2O\text{—}CH\\ \phantom{C_{16}H_{33}SCH_2CH_2CH_2O\text{—}CH}HCO\text{—}CH_2CH_2CH_2SC_{16}H_{33}\\ \phantom{C_{16}H_{33}SCH_2CH_2CH_2O\text{—}CH}HCO\text{—}CH_2CH_2CH_2SC_{16}H_{33}\\ \phantom{C_{16}H_{33}SCH_2CH_2CH_2O\text{—}CH}CH_2OCH_2CH_2CH_2SC_{16}H_{33}\end{array}$ $\begin{array}{l}\phantom{C_{18}H_{37}SCH_2CH_2CH_2O\text{—}CH}CH_2OCH_2CH_2CH_2SC_{18}H_{37}\\ \phantom{C_{18}H_{37}SCH_2CH_2CH_2O\text{—}CH}HCO\text{—}CH_2CH_2CH_2SC_{18}H_{37}\\ C_{18}H_{37}SCH_2CH_2CH_2O\text{—}CH\\ \phantom{C_{18}H_{37}SCH_2CH_2CH_2O\text{—}CH}HCO\text{—}CH_2CH_2CH_2SC_{18}H_{37}\\ \phantom{C_{18}H_{37}SCH_2CH_2CH_2O\text{—}CH}HCO\text{—}CH_2CH_2CH_2SC_{18}H_{37}\\ \phantom{C_{18}H_{37}SCH_2CH_2CH_2O\text{—}CH}CH_2OCH_2CH_2CH_2SC_{18}H_{37}\end{array}$ $\begin{array}{l}\phantom{C_9H_{19}SCH_2CH_2CH_2OCH}CH_2OCH_2CH_2CH_2SC_9H_{19}\\ \phantom{C_9H_{19}SCH_2CH_2CH_2OCH}HCOCH_2CH_2CH_2SC_9H_{19}\\ C_9H_{19}SCH_2CH_2CH_2OCH\\ \phantom{C_9H_{19}SCH_2CH_2CH_2OCH}HCOCH_2CH_2CH_2SC_9H_{19}\\ \phantom{C_9H_{19}SCH_2CH_2CH_2OCH}HCOCH_2CH_2CH_2SC_9H_{19}\\ \phantom{C_9H_{19}SCH_2CH_2CH_2OCH}CH_2OCH_2CH_2CH_2SC_9H_{19}\end{array}$ -continued
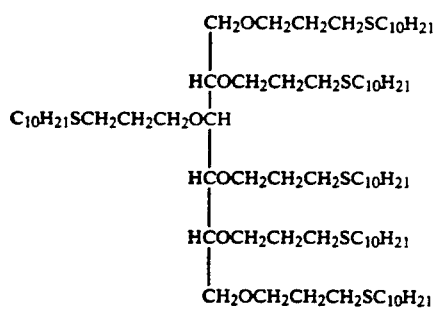
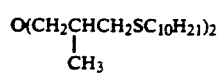
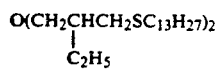
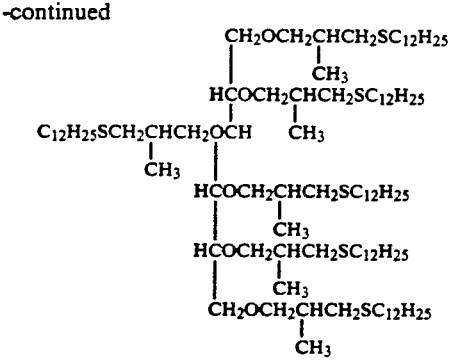
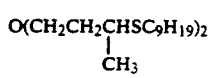
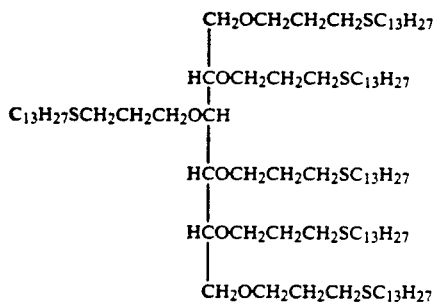
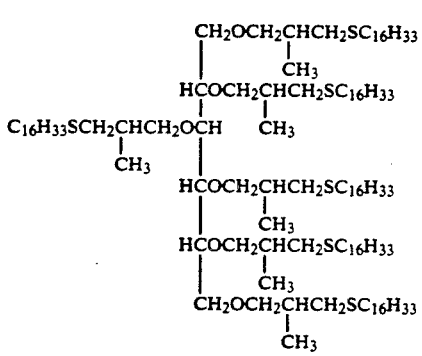
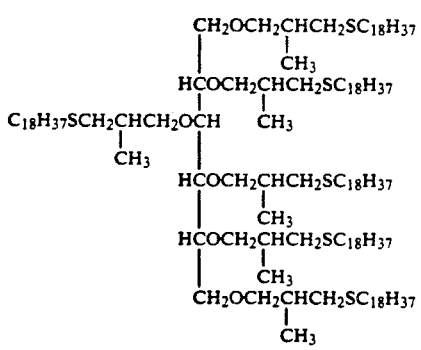
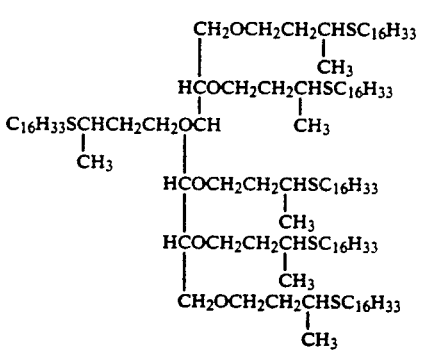
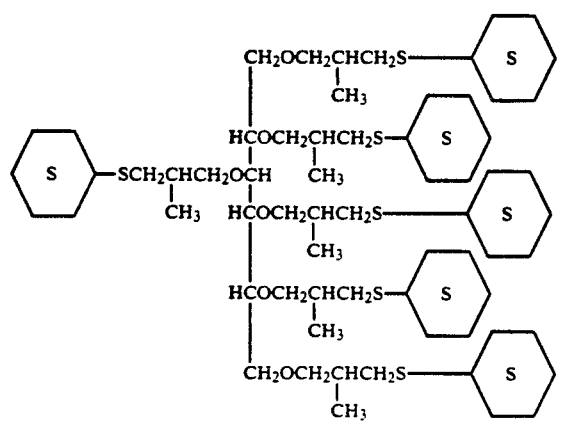
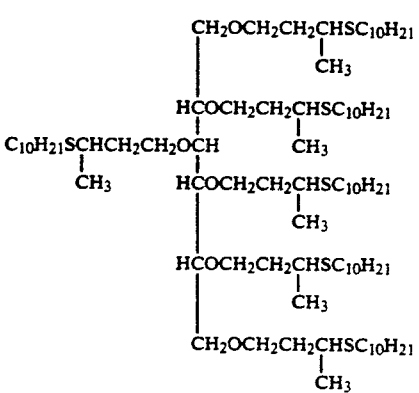

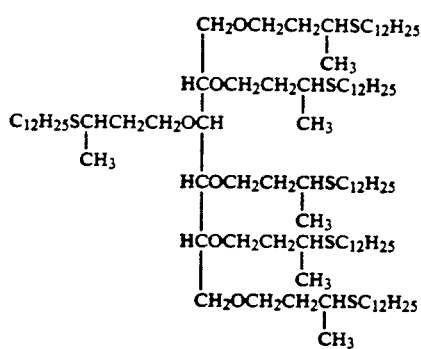
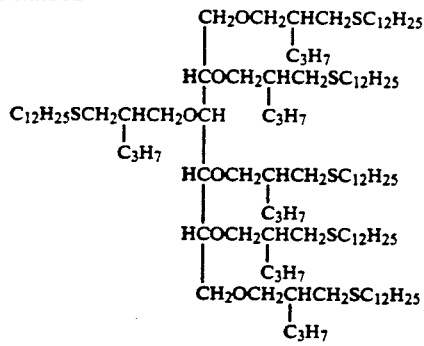

In the following non-limiting representative structure for the present organic sulfides, the sorbitan backbone is 1,4-sorbitan, which comprises approximately 85% of the sorbitan which is conventionally used. Sorbitan also generally contains about 13% of 3,6-sorbitan and about 2% of 2,5-anhydro-L-iditol (both isomers of 1,4-sorbitan). Therefore, it would be understood to one skilled in the art that the organic sulfides set forth below derived from 1,4-sorbitan also include the isomers discussed above (see e.g., the *Encyclopedia of Chemical Technology*, Volume 1, Third Edition, pages 778-789 (1978)).

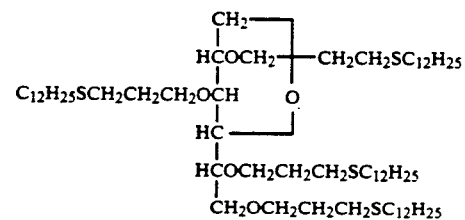
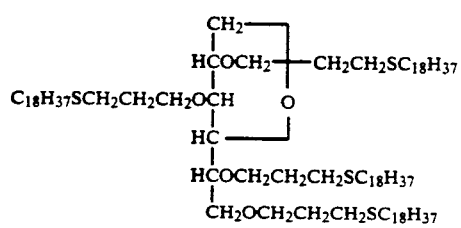
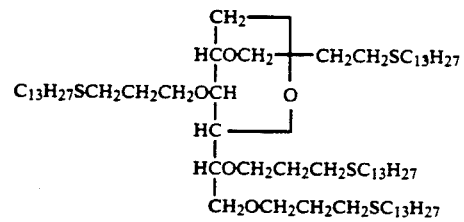
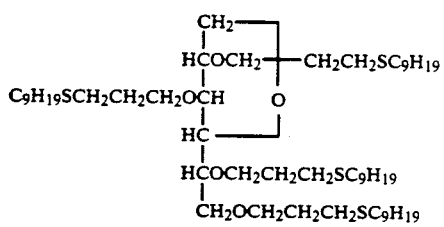
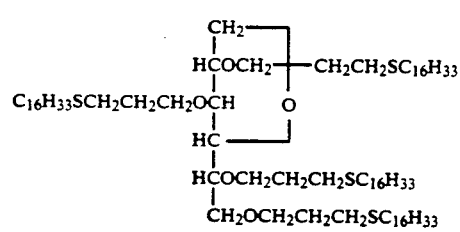
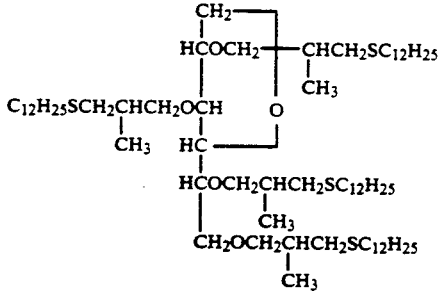
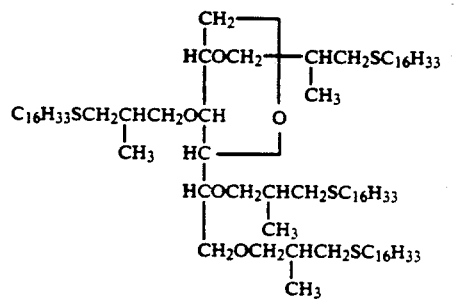
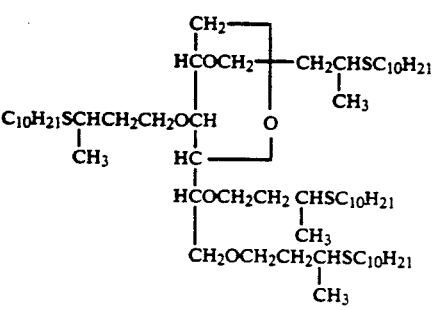

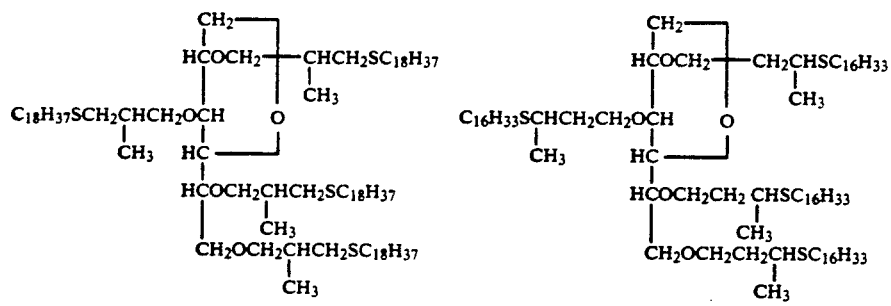
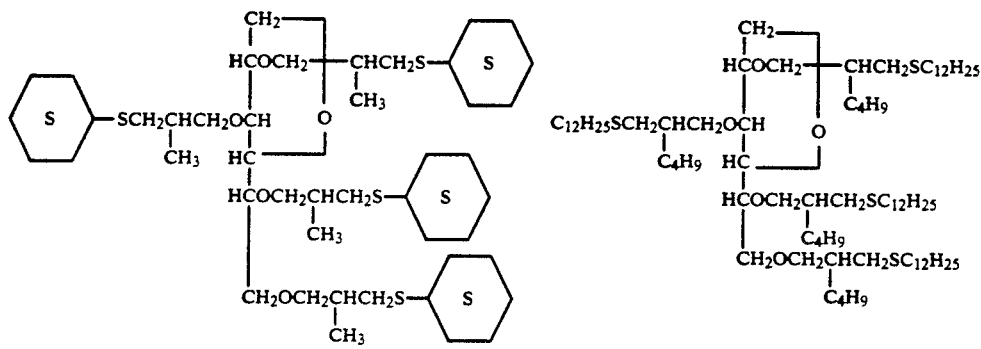
The following non-limiting examples of representative organic sulfides are derived from sucrose, wherein Z is $CH_2CH_2CH_2SR^3$; $Z^1$ is
$$\underset{CH_3}{CH_2\overset{|}{C}HCH_2SR^3}; Z^2 \text{ is } \underset{CH_3}{CH_2CH_2\overset{|}{C}HSR^3};$$
and $R^3$ is as defined above:
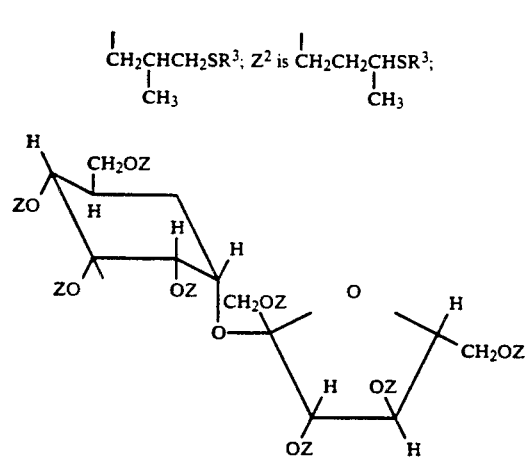
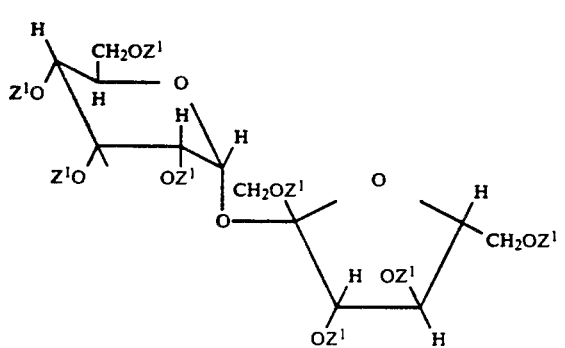
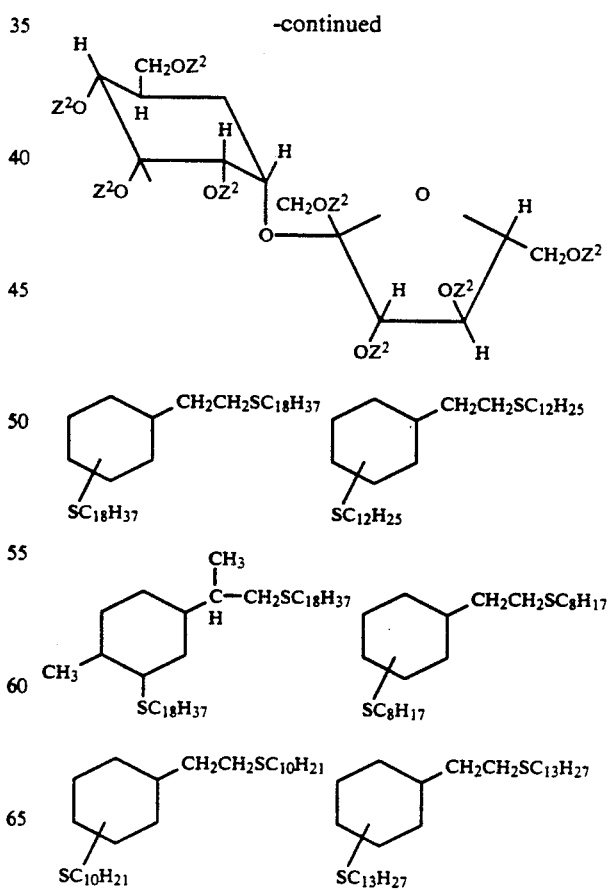

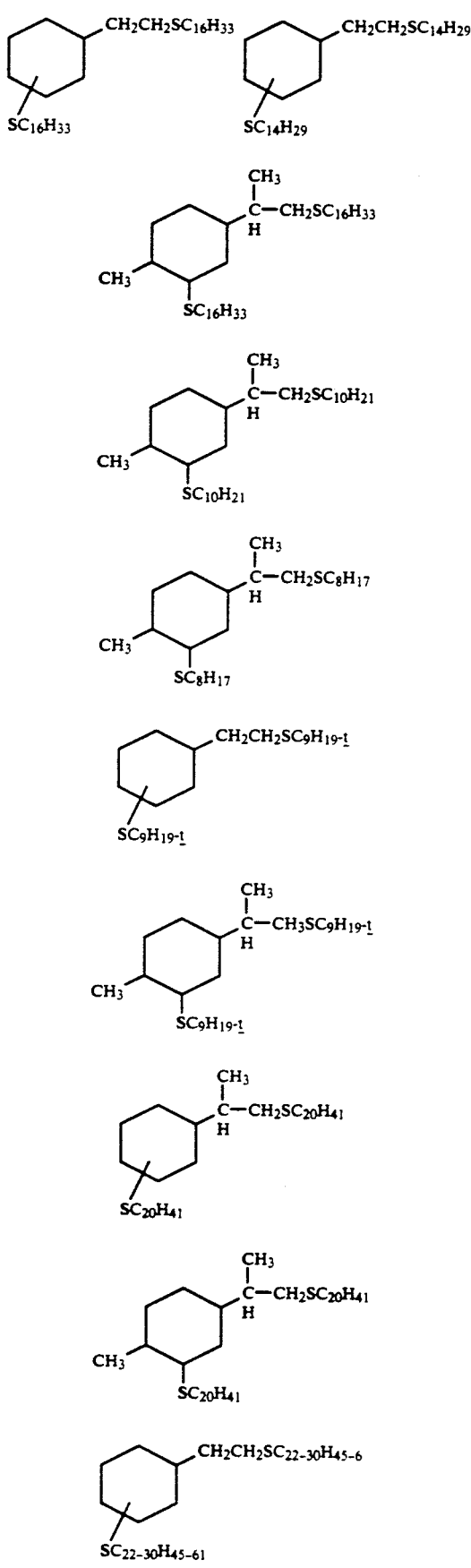
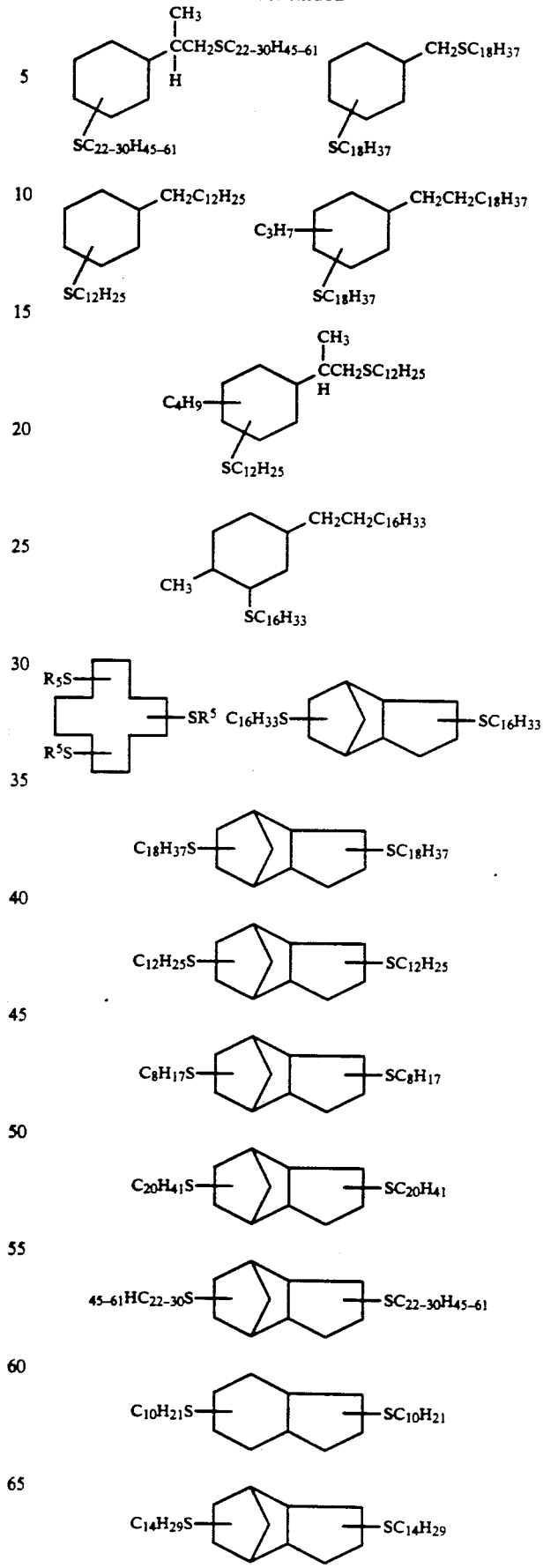

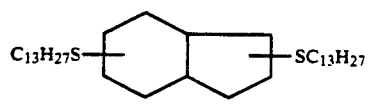
$R^5$ in the non-limiting exemplary formulas set forth below represents an alkyl group of 8–24 carbons; and $R^6$ represents an alkyl group of 1–7 carbons.
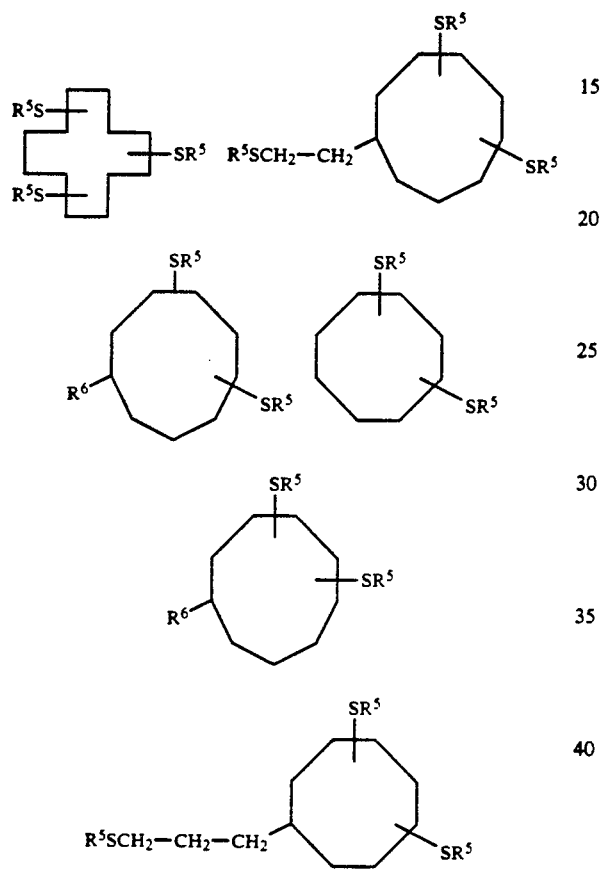
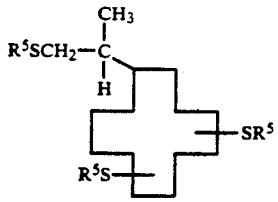
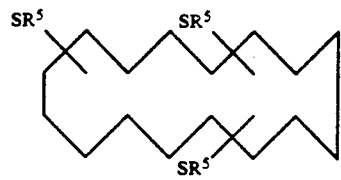
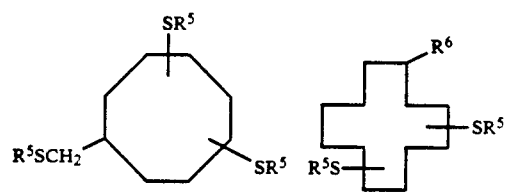
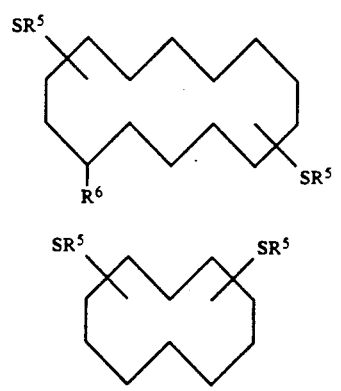
Non-limiting examples of preferred organic sulfide antioxidants in accordance with the present invention and represented by Formula I, II or III are set forth below:
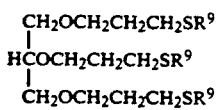
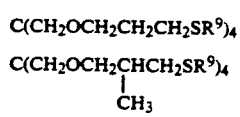
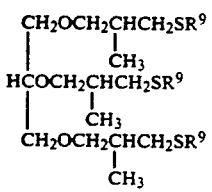
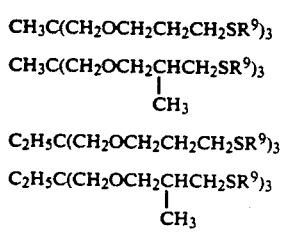

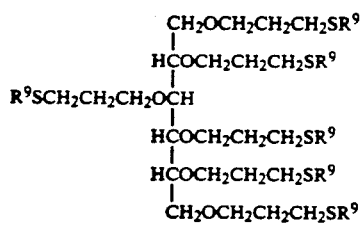
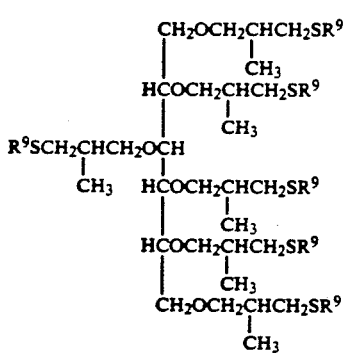
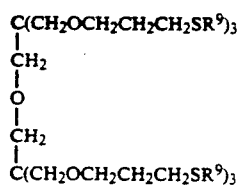
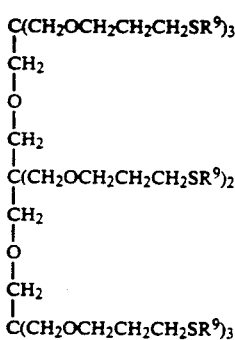
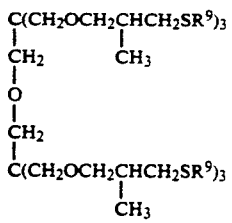
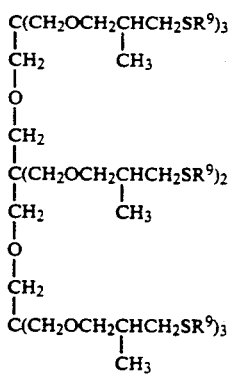
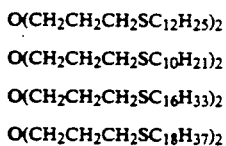
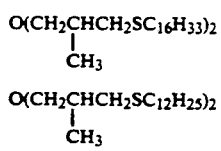
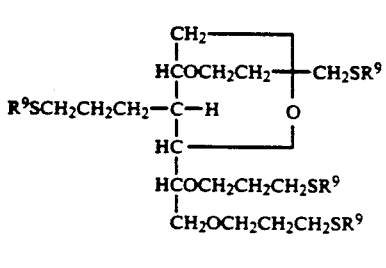
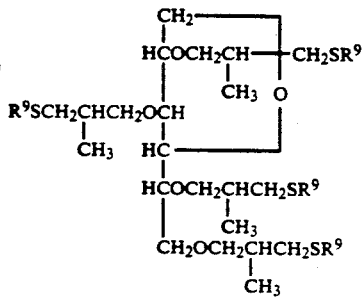
(plus other isomers of sorbitan)

-continued
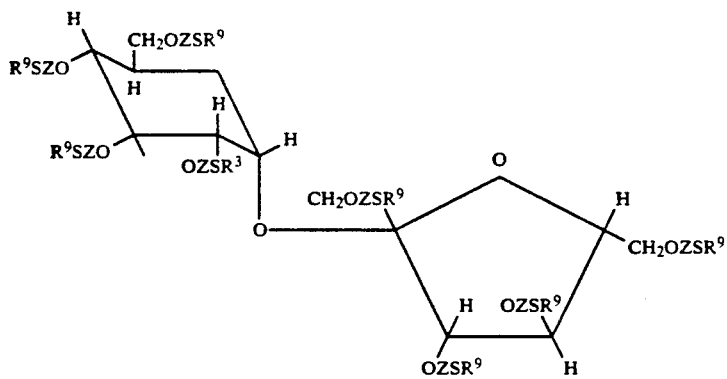
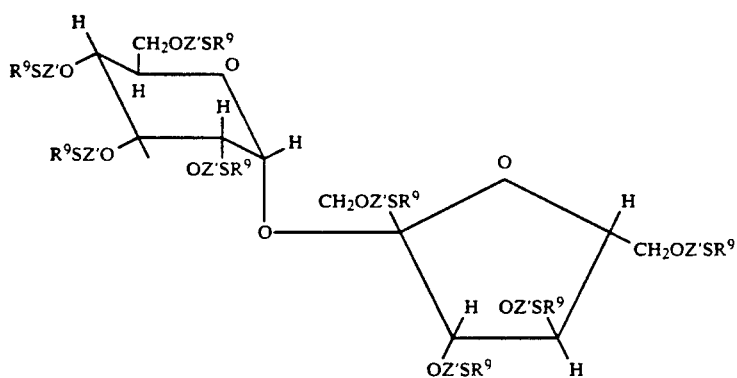
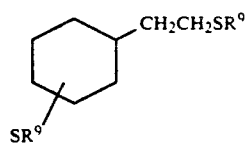 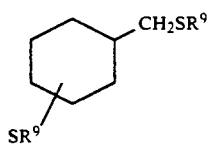
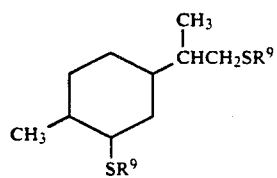 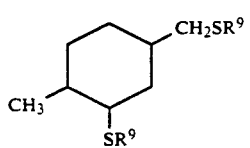
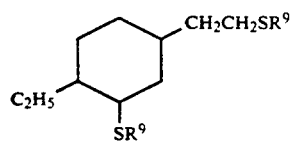 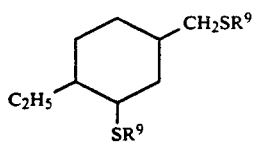
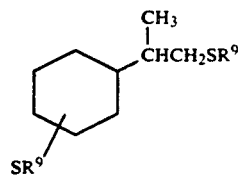 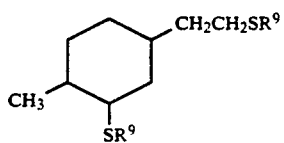
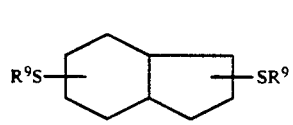 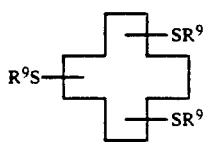

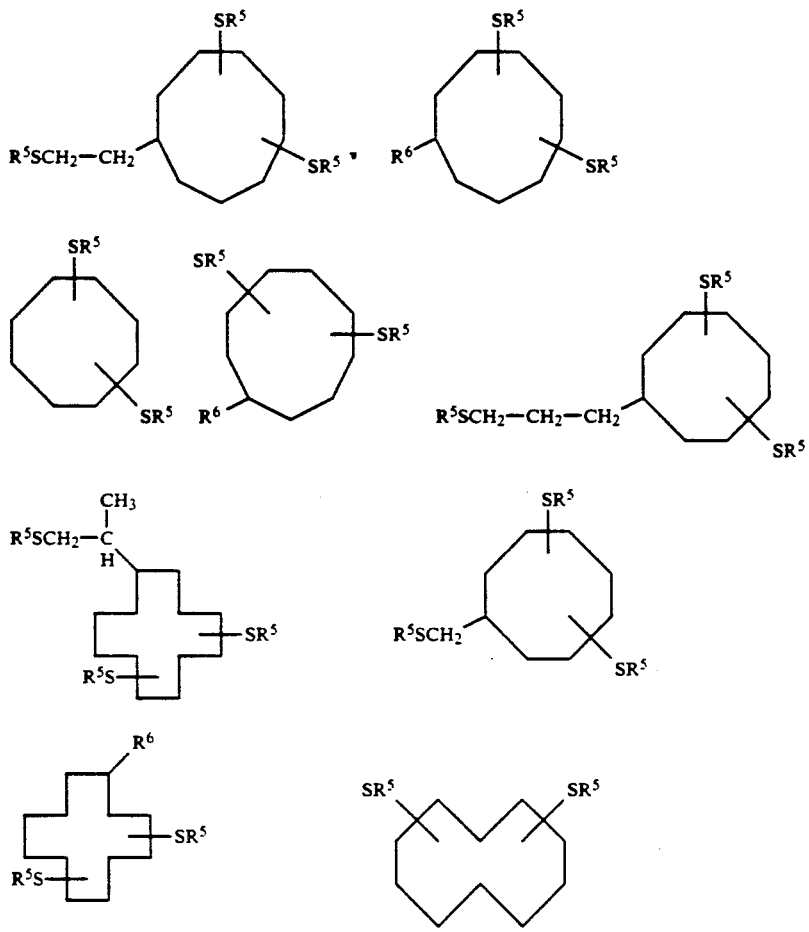
$R^9$ in the formulas set forth above represents an alkyl group of about 10 to about 18 carbons; $R^6$ is H, $CH_3$ or $C_2H_5$; and Z and Z' are as defined above.
Non-limiting examples of the most preferred organic sulfide antioxidants in accordance with the present invention and represented by Formula I, II or III are as follows:
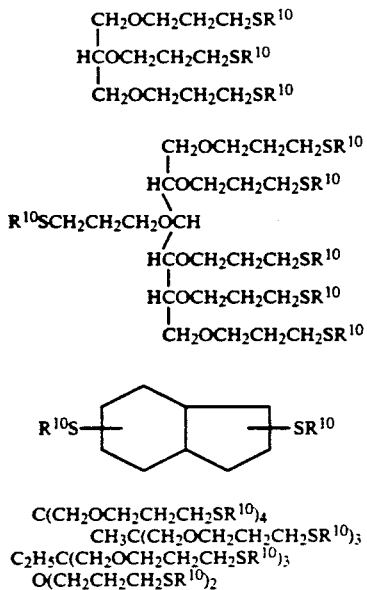
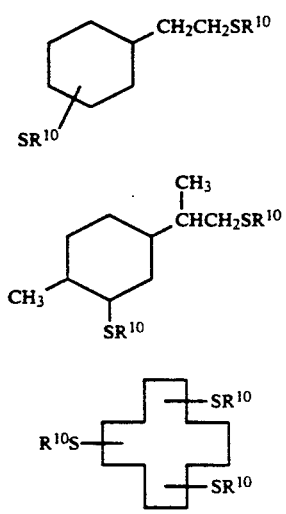

-continued

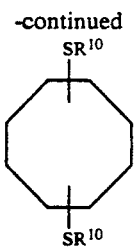

R[10] in the formulas set forth above represents an alkyl group of about 12 to about 18 carbons.

The organic sulfides of the present invention and represented by Formulas I, II or III, may be prepared, for example, by the methods disclosed in U.S. Pat. Nos. 3,652,680 and 3,772,246, the disclosures of which are incorporated herein by reference.

Compounds of Formula (I) may be prepared e.g., by first reacting a polyol (with two or more hydroxyl groups per molecule) with an allylic or substituted allylic halide (e.g., chloride, bromide, or iodide) in the presence of a base, such as sodium or potassium hydroxide. The amount of base used should be an amount sufficient to remove by-product hydrogen halide and to form the corresponding polyallylic ether. Water or an inert solvent may be used if necessary to facilitate the separation of the by-product metal halide from the polyallylic ether.

Next, a mercaptan is added to the resultant polyallylic ether of the above reaction, under free radical conditions (i.e., in the presence of peroxides, azo compounds, ultra-violet light, etc.), in order to form the antioxidant compounds of this invention. The number of moles of mercaptan employed in this reaction is an amount at least equal to the number of double bonds in the polyallylic ether.

Compounds of Formula (II) and (III) may be prepared by adding a mercaptan to either a diallyl ether or an olefin, respectively, by the method described above for compounds represented by Formula (I). Other appropriate methods useful for the preparation of compounds represented by Formulas (I), (II) or (III) of the present invention will be apparent to one skilled in the art based upon the present disclosure.

Resins which may be used in the present invention are generally polymeric resins which can be classified as "engineering resins". As discussed above, "engineering resins" are resins which are capable of sustaining high loads and stresses, are machinable and are dimensionally stable. Engineering resins are generally subjected to extreme temperatures both during processing and use of the finished article. These resins are known as engineering resins since they can be used for various types of engineering applications in much the same manner as metals.

Appropriate engineering resins for use in the present invention include, for example and without limitation, polycarbonates, polyarylethers, polyamides (i.e., nylons), polyesters, polyacetals, polysulfides, cellulose esters, and styrene copolymers.

Preferred engineering resins for use in the present invention include, for example without limitation, poly(2,6-diemthyl-p-phenylene oxide), poly(2,3,6-trimethyl-p-phenylene oxide), poly(phenylene ether-sulfone), polycaprolactam, polyhexamethylene adipamide, polyhexamethylene nonanediamide, polyhexamethylene sebacamide, polyhexamethylene dodecanediamide, polyhexamethylene terephthalamide, polyundecanoamide, polylauryllactam, poly(phenylene sulfide), poly(ethylene terephthalate), poly(1,4-butylene terephthalate), poly(1,4-cyclohexanedimethlene terephthalate), poly(acetal), cellulose acetate, cellulose acetate propionate, styrene maleic anhydride copolymers and polycarbonates derived from 2,2-bis(4-hydroxyphenyl)propane.

In the compositions according to the present invention, the organic sulfide antioxidants are generally contained in weight rations of organic sulfide to engineering resin of about 1:10,000 to about 1:20. Preferably, the present compositions contain a weight ratio amount of organic sulfide to engineering resin of about 1:1000 to about 1:50. Of course, the exact amount of the organic sulfide antioxidant present in the compositions according to the present invention will vary depending upon the particular organic sulfide antioxidant and engineering resin used, the use for which the engineering resin will be put, the stresses which the engineering resin must withstand, etc. The exact amount used will be easily determinable by one skilled in the art. Where ratios other than those disclosed above will be evident to one of ordinary skill in the art based upon the present disclosure.

The present organic sulfides may be used as the sole stabilizer in the engineering resins of the present invention. However, for some purposes it may be appropriate to use the present organic sulfide antioxidant in combination with an auxiliary stabilizer, such as hindered phenols, phosphites, organic amines, benzophenones, and benzotriazoles. Appropriate hindered phenols include pentaerythritol tetrakis (3,5-di-t-butyl-4-hydroxyhydrocinnamate). Appropriate phosphites include distearyl pentaerythritol diphosphite. Appropriate organic amine include, for example, N,N'-diphenyl-p-phenylenediamine and bis(2,2,6,6-tetramethyl-4-piperidinyl) sebacate. Appropriate benzophenones include 2-hydroxy-4-n-octoxybenzophenones, while appropriate benzotriazoles include 2-(2-hydroxy-5-t-octylphenyl)-benzotraizole. Other auxiliary stabilizers appropriate for use in the present invention will be evident to one skilled in the art based upon the present disclosure.

The present compositions may further contain conventional polymer additives such as processing aids, anti-blocking agents, slip agents, flame retardants, smoke suppressants, coupling agents, wetting agents, pigments, fillers, reinforcements, etc. Appropriate pigments include titanium dioxide, carbon black, etc. Appropriate reinforcements include mica, clay, talc, organic fibers, carbon or graphite fibers, etc. Other appropriate additives which may be used in the compositions of the present invention will be evident to one skilled in the art based upon the present disclosure.

The present compositions may be readily prepared by methods known in the art. For example, the organic sulfides of the present invention may be readily incorporated into the engineering resins of the present composition using conventional techniques at any appropriate stage prior to the manufacture of the desired product. For example, the organic sulfide may be mixed with the polymer in dry powder form. The composition may be then melted or processed by, e.g., extrusion or injection molding into the finished article. Other methods useful for the preparation of the present compositions will be evident to one skilled in the art based upon the present disclosure.

The present invention will now be further illustrated by reference to the following, specific, non-limiting examples.

EXAMPLE 1

Preparation of beta (n-octadecylthio) ethyl-3-(n-octadecylthio)cyclohexane and (n-octadecylthio)ethyl-4-(n-octadecylthio)cyclohexane A stirred mixture of 176 g (1 mole) of beta-mercaptoethyl-3-mercaptocyclohexane (prepared as a mixture of isomers and not separated) and 560 g (2 moles) of 1-octadecene under a blanket of nitrogen was heated to 80° C. To this mixture of 1.5 g of 2,2'-azobis-(isobutyronitrile) dispersed in 25 g (0.08 moles) of 1-octadecene was added in four equal portions over a four hour period. The addition of the first portion of the 2,2'-azobis(isobutyronitrile) was accompanied by an exotherm to 110° C. The reaction was then held at 80° C. for another four hours, and then 755 g of hexane was added. This solution was then cooled to 4° C. and the product was collected by filtration, washed with 378 g of cold hexane, and air dried to yield 516 g (68%) of product. The elemental analysis for $C_{44}H_{88}S_2$ (theoretcially C: 77.80%; H: 12.76%; and S: 9.44%) found 77.7% of C; 12.7% of H; and 9.25% of S.

EXAMPLE 2

Preparation of 2,9-bis(n-octadecylthio)-p-methane

The procedure used was essentially the same as that described in Example 1. A stirred mixture of 305 g (1.498 moles) of 2,9-dimercapta-p-menthane and 786.8 g (3.05 moles) of 1-octadecene were reacted at 80° C. in the presence of 1.25 g of 2,2'-azobis(isobutyronitrile). The reaction mixture was recrystallized from 1093 g of hexane, collected by filtration, washed with 546 g of cold hexane and air dried to give 540 g (49%) of product. The analysis for $C_{46}H_{92}S_2$ (theoretically, C: 77.9%; H: 13.1%; S: 9.0%) found 78.2% of C; 12.9% of H; and 8.92% of S.

EXAMPLE 3

Preparation of 1,4(or 5), 8(or 9)-tris(n-hexadecylthio)cyclododecane

The preparation method used was essentially the same as described in Example 1. A stirred mixture of 48.8 g (0.185 moles) of 1,4(or 5), 8(or 9)-trimercaptocyclododecane (prepared as a mixture of isomers and not separated) and 137 g (0.609 moles) of 1-hexadecene were reacted at 80° C. in the presence of 0.4 g of 2,2'-azobis (isobutyronitrile). The reaction mixture was recrystallized three times from 200 g of hexane resulting in 34 g of purified product (an isomeric mixture). Anal. Calc., for $C_{60}H_{120}S$ (C: 76.8; H: 12.9; S: 10.3) found 76.7% C; 12.5% H; and 10.2% S.

EXAMPLE 4

Preparation of pentaerythritol tetrakis(n-hexadecylthiopropyl)ether and pentaerythritol tris(n-hexadecylthiopropyl)ether A 250 ml three-necked flask equipped with a magnetic stirrer, a condenser and a nitrogen inlet tube was first purged with nitrogen. 91 g of n-Hexadecyl mercaptan (0.35 moles) was then charged and heated to 80° C. To the heated and stirred n-hexadecyl mercaptan, 0.2 g of a solution of 2,2]-azobis(isobutyronitrile) in a mixture of pentaerythritol tetraallyl and triallyl ether (26.4 g of an 20.80 mixture by weight, 0.32 moles of unsaturation) was added dropwise over a 15 minute period. One-half hour after this addition was completed, 0.1 g of 2,2'-azobis(isobutyronitrile) was added. Two more 0.1 g additions of azobis(isobutyronitrile) were made at half-hour periods. After the last addition the reaction was held at 80° C. for an additional hour. The crude product, a wax-like solid, was then recrystallized four times from a mixture of 400 ml of isopropanol and 100 ml of hexane yielding 41 g (38%) of a mixture of the pentaerythritol tetrakis (n-hexadecylthiopropyl) ether and tris(n-hexadecylthiopropyl)ether. The final product was a white solid with a melting range 40°-48° C. An NMR analysis of the product indicated a 40/60 ratio of the tetrakis/tris ethers. The elemental analysis found: C-73.3%, H-12.5%, S-9.26%, OH-1.12%, calculated for $C_{88}H_{164}S_4O_4$ (theoretically C-73.12%, H-12.43%, S-9.64%, O-4.81% and $C_{62}H_{127}O_4S_3$ (theoretically, C-72.16%, H-12.30%, S-9.3%, O-6.2%, OH-1.7%).

EXAMPLE 5

Example 5 demonstrates the preparation of pentaerythritol tetrakis (n-hexadecylthiopropyl)ether.

The procedure used was identical to that set forth in Example 4, except that 107 g of hexadecyl mercaptan (0.417 moles) was reacted with 29.64 g of pure pentaerythritol tetraallyl ether (0.1 moles). The crude product was recrystallized three times in 300 ml of hexane yielding 57 g of white solid having a melting point 55°-57° C. The elemental analysis found: C-73.4%, H-11.9%, S-10.0%, calculated for $C_{88}H_{164}S_4$ (theoretical C-73.12%, H-12.4%, S-9.64% and O-4.81%).

EXAMPLE 6

Pentaerylthritol tetra(n-dodecylthiopropyl) ether

The procedure used was identical to that described in Example 4, except that 123.9 g of n-dodecylmercaptan (0.612 moles) was reacted with 44.5 g of pentaerythritol tetraallylether (0.15 moles). The crude product was recrystallized twice in 800 ml of hexane yielding 95 g of a white solid having a melting point of 38°-40° C.

EXAMPLE 7

Example 7 demonstrates the preparation of pentaerythritol tetrakis (n-octadecylthiopropyl) ether.

The procedure used was identical to that set forth in Example 4, except that 119.4 g of n-octadecyl mercaptan (0.417 moles) was reacted with 29.6 g of pentaerythritol tetraallyl ether (0.1 moles). The crude product was recrystallized three times in 300 ml of hexane yielding 54 g of a white solid having a melting point of 60°-63° C.

EXAMPLE 8

Example 8 demonstrates the preparation of trimethylolpropane tris(n-hexadecylthiopropyl) ether.

The procedure used was identical to that of Example 4, except that 79.3 g of hexadecyl mercaptan (0.307 moles) was reacted with 25 g of trimethyl propane triallyl ether (0.0783 moles). The crude product was recrystallized three times in 300 ml of hexane yielding 34 g of a white solid having a melting point of 39°-44' C.

EXAMPLE 9

Example 9 demonstrates the preparation of trimethylolpropane tris(n-octadecylthiopropyl) ether.

The procedure used was identical to that set forth in Example 4, except that 92.7 g of n-octadecyl mercaptan (0.323 moles) was reacted with 25 g of trimethylol propane triallyl ether (0.0983 moles). The crude product was recrystallized three times in 300 ml of hexane yielding 53 g of a white solid having a melting point of mp 43°-45° C.

EXAMPLE 10

Example 10 demonstrates the preparation of dipentaerythritol hexakis(n-oxtylthiopropyl) ether.

The procedure used was identical to that of Example 4 except that 134.4 g of mercaptan (0.919 moles) was reacted with 74.25 g of dipentaerythritol hexaally ether (0.15 moles). The crude product, an oil, was low-temperature recrystallized three times at −76° C. (dry-ice-/acetone bath) in 500 ml of hexane yielding 20 g of a clear oil.

EXAMPLE 11

Example 11 demonstrates the preparation of dipentaerythritol hexakis(n-dodecylthiopropyl) ether.

The procedure used was identical to that of Example 4, except that 123.9 g of n-dodecyl mercaptan (0.612 moles) was reacted with 49.5 g of dipentaerythritol hexaallyl ether (0.10 moles). The crude product, an oil, was low temperature recrystallized three times at −10° C. in 500 ml hexanes yielding 38 g of a clear oil.

EXAMPLE 12

Example 12 demonstrates the preparation of dipentaerythritol hexakis(n-hexadecylthiopropyl) ether.

The procedure used was identical to that set forth in Example 4, except that 158.3 g of hexadecyl mercaptan (0.612 moles) was reacted with 49.5 g of dipentaerythritol hexaallylether (0.10 moles). The crude product, a solid, was recrystallized three times in 600 ml of hexane yielding 75 g of a white solid having a melting point of 44°-45° C.

EXAMPLE 13

Example 13 illustrates the greater stability of the sulfide antioxidants of this invention as compared to conventional antioxidants. Thermogravimetric analysis is the method conventionally used in the plastics industry to determine the stability of a plastic additive. Small samples (10-25 mg) of the antioxidants were heated in platinum boats at a rate of 10° C. per minute and the temperature required for a weight loss of 5% was determined. The gas flow was 200 cc per minute in a DuPont Model 9900 Thermogravimetric Analyzer. The first five samples tested (i.e., A-E) are conventional stabilizers which are currently used in the plastics industry.

TABLE I

| | Temperature (°C.) for 5% Weight Loss | |
|---|---|---|
| | Temperature (°C.) in | |
| | Nitrogen | Air |
| A) distearyl thiodipropionate | 271 | 266 |
| B) dilauryl thiodipropionate | 308 | 259 |
| C) distearyl pentaerythritol diphosphite | 252 | 259 |
| D) tetrakis[2,4-di-t-butylphenyl]-4,4'biphenylylenediphosphonite | 171 | 160 |
| E) tris(2,5-di-t-butylphenyl) phosphite | 291 | 280 |
| Product of Example 1 | 354 | 315 |
| Product of Example 2 | 340 | 300 |
| Product of Example 3 | 342 | 312 |
| Product of Example 4 | 359 | 314 |

TABLE I-continued

| Temperature (°C.) for 5% Weight Loss | |
|---|---|
| Temperature (°C.) in | |
| Nitrogen | Air |
| Product of Exmaple 5 | 368 |
| Product of Example 7 | 376 |
| Product of Example 8 | 374 |
| Product of Example 9 | 367 |
| Product of Example 10 | 365 |
| Product of Example 11 | 357 |
| Product of Example 12 | 359 |

As can be seen from Table I, the sulfide antioxidants of the present invention clearly demonstrate a much higher stability than conventional antioxidants. Specifically, significantly higher temperatures were required to cause a 5% weight loss in the present sulfide antioxidants in both nitrogen and air compared to the prior art antioxidants.

The present invention may be embodied in other specific forms without departing from the spirit or essential attributes thereof and, accordingly, reference should be made to the appended claims, rather than to the foregoing specification as indicating the scope of the invention.

We claim:

1. A composition comprising a polymeric engineering resin selected from the group consisting of polyarylethers, polyamides, polyesters, polyacetals, polyaryl sulfides, cellulose esters and styrene copolymers; and an amount of an organic sulfide sufficient to stabilize the resin against oxidative or thermal degradation during processing and use, the organic sulfide antioxidant being represented by Formula I, II or III:

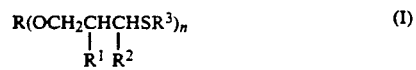

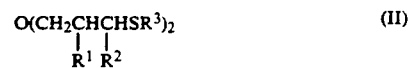

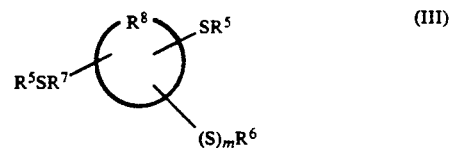

wherein:
n is an integer of 2 to 15;
m is 0 or 1;
R is a substituted or unsubstituted multivalent alkyl group of 2 to 30 carbons, a substituted or unsubstituted multivalent cycloalkyl group of 5 to 20 carbons, a substituted or unsubstituted multivalent alkyl group of 2 to 30 carbons where any of up to 6 carbon atoms are replaced with an O or S heteroatom, a substituted or unsubstituted multivalent cycloalkyl group of 5 to 20 carbons where any of up to 6 carbon atoms are replaced with an O heteroatom, with the proviso that the heteroatoms must be separated from each other and from the portion of the compound to which the R group is bonded by at least one carbon atom, the substituents for R being —OH, SR$^4$ or —OR$^4$, wherein R$^4$ is an alkyl group of 1 to 30 carbons or a cycloalkyl group of 5 to 20 carbons;

$R^1$ and $R^2$ are independently H or an alkyl group of 1 to 4 carbons;

$R^3$ is an alkyl group of 1 to 24 carbons or a cycloalkyl group of 5 to 20 carbons;

$R^5$ is an alkyl group of 1 to 24 carbons;

$R^6$ is H or an alkyl group of 1 to 24 carbons, with the provisos that when m=0, $R^6$ is H or an alkyl group of 1 to 7 carbons and when m=1, $R^6$ is alkyl group of 1 to 24 carbons;

$R^7$ is a direct bond or an alkylene group of 1 to 4 carbons; and $R^8$ is a monocyclic, bicyclic or tricyclic cycloalkyl group of 5 to 16 carbons.

2. A composition as in claim 1, wherein the polymeric engineering resin is selected from the group consisting of poly(2,6-diethyl-p-phenylene oxide), poly(2,3,6-trimethyl-p-phenylene oxide), poly(phenylene ether-sulfone), polycaprolactam, polyhexamethylene adipamide, polyhexamethylene nonanediamine, polyhexamethylene sebacamide, polyhexamethylene dodecanediamide, polyhexamethylene terephthalamide, polyundecanoamide, polylauryllactam, poly(phenylene sulfide), poly(ethylene terephthalate), poly(1,4-butylene terephthalate), poly(1,4-cyclohexanediamethylene terephthalate), poly(acetal), cellulose acetate, cellulose acetate propionate, and styrene maleic anhydride copolymers.

3. A composition as in claim 1, wherein the organic sulfide is represented by Formula I or II, wherein R is:

$$CH_2-CH-CH_2, \quad -CH_2-\underset{CH_2-}{\overset{CH_2-}{\underset{|}{C}}}-CH_2-, \quad C_2H_5-\underset{CH_2-}{\overset{CH_2-}{\underset{|}{C}}}-CH_2-,$$

$$CH_3-\underset{CH_2-}{\overset{CH_2-}{\underset{|}{C}}}-CH_2-, -CH_2-\underset{CH_2-}{\overset{CH_2-}{\underset{|}{C}}}-CH_2-O-CH_2-\underset{CH_2-}{\overset{CH_2-}{\underset{|}{C}}}-CH_2-$$

$$-CH_2-\underset{CH_2-}{\overset{CH_2-}{\underset{|}{C}}}-CH_2-O-CH_2-\underset{CH_2-}{\overset{CH_2-}{\underset{|}{C}}}-CH_2-O-CH_2-\underset{CH_2-}{\overset{CH_2-}{\underset{|}{C}}}-CH_2-,$$

$$-CH_2-\underset{H}{\overset{H}{\underset{|}{C}}}-\underset{H}{\overset{|}{\underset{|}{C}}}-\underset{H}{\overset{|}{\underset{|}{C}}}-CH_2-$$

[cyclic structures with O bridges]

-continued

[cyclic disaccharide structure with CH_2 groups, O linkages labeled α and β]

wherein ∞ and β are the types of linkages; and
wherein:
$R^1$ is H or $CH_3$;
$R^2$ is H; and
$R^3$ is an alkyl group of 10 to 18 carbons.

4. A composition as in claim 3, wherein R is:

$$CH_2-CH-CH_2, \quad -CH_2-\underset{CH_2-}{\overset{CH_2-}{\underset{|}{C}}}-CH_2-, \quad C_2H_5-\underset{CH_2-}{\overset{CH_2-}{\underset{|}{C}}}-CH_2-,$$

$$CH_3-\underset{CH_2-}{\overset{CH_2-}{\underset{|}{C}}}-CH_2-, \text{ and } -CH_2-\underset{H}{\overset{|}{\underset{|}{C}}}-\underset{H}{\overset{|}{\underset{|}{C}}}-\underset{H}{\overset{|}{\underset{|}{C}}}-CH_2, \text{ or}$$

wherein:
$R^1$ and $R^2$ are H; and
$R^3$ is an alkyl group of 12 to 18 carbons.

5. A composition as in claim 1, wherein the organic sulfide antioxidant is represented by Formula III and has one of the following structures:

[cyclohexane with $CH_2CH_2SR^5$ and $SR^5$ substituents]

[methylcyclohexane with $CHCH_2SR^5$ and $SR^5$ substituents]

[cross-shaped structure with $SR^5$ groups]

6. A composition as in claim 1, comprising a weight ratio of the organic sulfide to the high temperature polymeric resin of about 1:10,000 to 1:20.

7. A composition as in claim 6, comprising a weight ratio of the organic sulfide to the polymeric resin of about 1:1000 to 1:50.

8. A composition as in claim 1, further comprising an auxiliary thermal stabilizer or light stabilizer.

9. A composition as in claim 8, wherein the auxiliary thermal stabilizer or light stabilizer is selected from the group consisting of hindered phenols, phosphites, organic amines, benzophenones and benzotriazoles.

10. A composition as in claim 1, further comprising polymer additives.

11. A composition as in claim 10, wherein the polymer additives are selected from the group consisting of processing aids, anti-blocking agents, slip agents, flame retardants, smoke suppressants, coupling agents and wetting agents, pigments, fillers and reinforcements.

12. A method for stabilizing a polymeric engineering resin against oxidative or thermal degradation, the polymeric engineering resin being selected from the group consisting of polyarylethers, polyamides, polyesters, polyacetals, polyaryl sulfides, cellulose esters and styrene copolymers, comprising adding to the polymeric engineering resin an amount of an organic sulfide stabilizer sufficient to stabilize the engineering resin against oxidative and thermal degradation during processing and use, the organic sulfide being represented by Formula I, II or III:

$$R(OCH_2CHCHSR^3)_n \quad (I)$$
$$\quad\quad\quad | \;\; |$$
$$\quad\quad\quad R^1 \; R^2$$

$$O(CH_2CHCHSR^3)_2 \quad (II)$$
$$\quad\quad | \;\; |$$
$$\quad\quad R^1 \; R^2$$

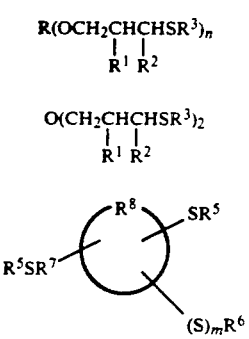

(III)

wherein:

m is 0 or 1;

n is an integer of 2 to 15;

R is a substituted or unsubstituted multivalent alkyl group of 2 to 30 carbons, a substituted or unsubstituted multivalent cycloalkyl group of 5 to 20 carbons, a substituted or unsubstituted multivalent alkyl group of 2 to 30 carbons where any of up to 6 carbon atoms are replaced with an O or S heteroatom, a substituted or unsubstituted multivalent cycloalkyl group of 5 to 20 carbons where any of up to 6 carbon atoms are replaced with an O heteroatom with the proviso that the heteroatoms must be separated from each other and from the portion of the compound to which the R group is bonded by at least one carbon atom, the substituents for R being —OH, $SR^4$ or —$OR^4$, wherein $R^4$ is an alkyl group of 1 to 30 carbons or a cycloalkyl group of 5 to 20 carbons;

$R^1$ and $R^2$ are independently H or an alkyl group of 1 to 4 carbons;

$R^3$ is an alkyl group of 1 to 24 carbons or a cycloalkyl group of 5 to 20 carbons;

$R^5$ is an alkyl group of 1 to 24 carbons;

$R^6$ is H or an alkyl group of 1 to 24 carbons, with the provisos that when m=0, $R^6$ is H or an alkyl group of 1 to 7 carbons and when m=1, $R^6$ is alkyl group of 1 to 24 carbons;

$R^7$ is a direct bond or an alkylene group of 1 to 4 carbons; and $R^8$ is a monocyclic, bicyclic or tricyclic cycloalkyl group of 5 to 16 carbons.

13. A method as in claim 12, wherein the organic sulfide is represented by Formula I or II, wherein R is:

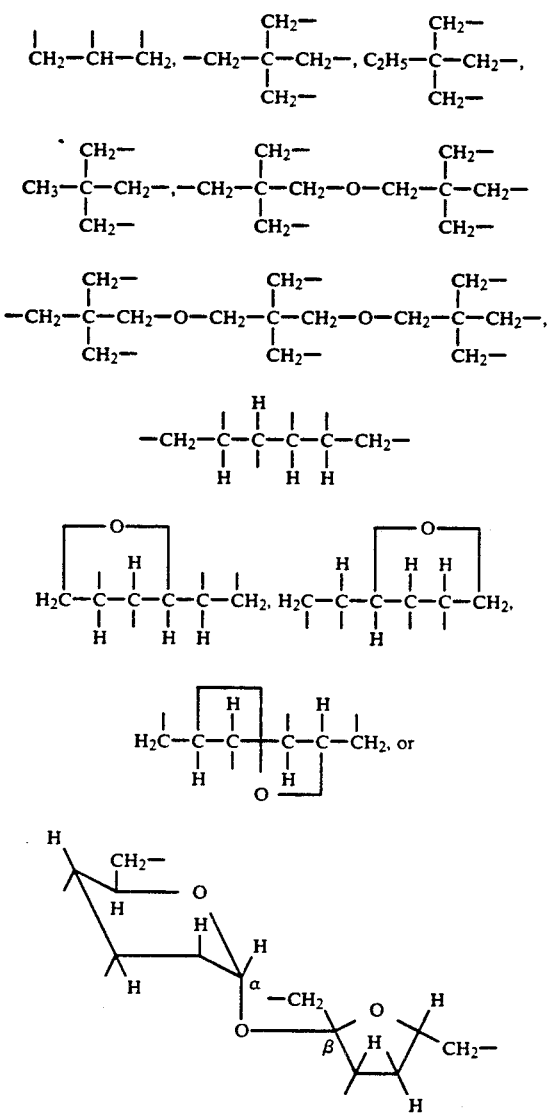

wherein ∞ and β are the types of linkages, wherein $R^1$ is H or $CH_3$;

$R^2$ is H; and $R^3$ is an alkyl group of 10 to 18 carbons.

14. A method as in claim 13, wherein R is:

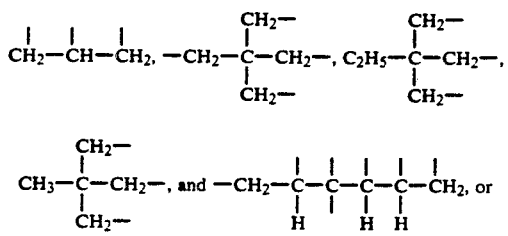

wherein $R^1$ and $R^2$ are H; and $R^3$ is an alkyl group of 12 to 18 carbons.

15. A method as in claim 12, wherein the organic sulfide antioxidant is represented by Formula III and has one of the following structures:

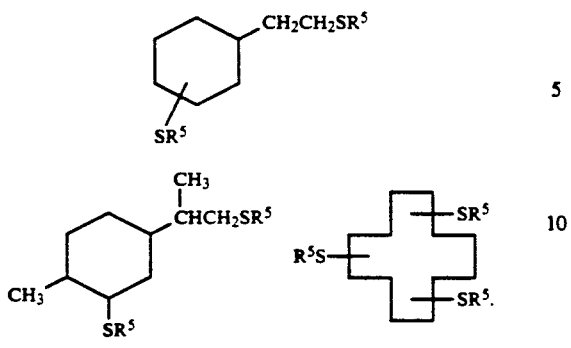

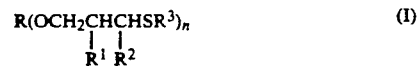

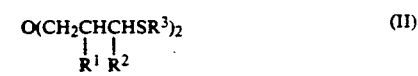

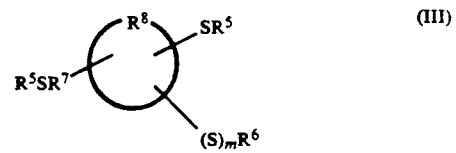

16. A method as in claim 12, wherein the polymeric engineering resin is selected from the group consisting of poly(2,6-diethyl-p-phenylene oxide), poly(2,3,6-trimethyl-p-phenylene oxide), poly(phenylene ether-sulfone), polycaprolactam, polyhexamethylene adipamide, polyhexamethylene nonanediamine, polyhexamethylene sebacamide, polyhexamethylene dodecanediamide, polyhexamethylene terephthalamide, polyundecanoamide, polylauryllactam, poly(phenylene sulfide), poly(ethylene terephthalate), poly(1,4-butylene terephthalate), poly(1,4-cyclohexanediamethylene terephthalate), poly(acetal), cellulose acetate, cellulose acetate propionate, and styrene maleic anhydride copolymers.

17. A composition as in claim 1, wherein the organic sulfide antioxidant is beta (n-octadecylthio)ethyl-3(4)-n-octadecylthio-cyclohexane).

18. A composition as in claim 1, wherein the organic sulfide antioxidant is 1,4(5), 8(9) tris(hexadecylthio)cyclododecane.

19. A composition as in claim 1, wherein the organic sulfide antioxidant is pentaerythritol tetrakis(n-octadecylthiopropyl) ether.

20. A composition as in claim 1, wherein the organic sulfide antioxidant is pentaerythritol tris (n-octadecylthiopropyl) ether.

21. A composition as in claim 1, wherein the organic sulfide antioxidant is pentaerythritol tetrakis(n-dodecylthiopropyl) ether.

22. A composition as in claim 1, wherein the organic sulfide antioxidant is pentaerythritol tris(n-dodecylthiopropyl) ether.

23. A composition as in claim 1, wherein the organic sulfide antioxidant is trimethylolpropane tris(n-octadecylthiopropyl) ether.

24. A composition as in claim 1, wherein the organic sulfide antioxidant is trimethylolpropane tris(n-hexyldecylthiopropyl) ether.

25. A composition as in claim 1, wherein the organic sulfide antioxidant is trimethylolpropane tris(n-octylthiopropyl) ether.

26. A composition as in claim 1, wherein the organic sulfide antioxidant is dipentaerythritol hexakis(n-dodecylthiopropyl) ether.

27. A composition as in claim 1, wherein the organic sulfide antioxidant is dipentaerythritol hexakis(n-hexadecylthiopropyl) ether.

28. A compound as in claim 1, in the form of a molded article.

29. A compound as in claim 17, in the form of a molded article.

30. A composition comprising a polycarbonate resin and an amount of an organic sulfide sufficient to stabilize the polycarbonate resin against oxidative or thermal degradation during processing and use, the organic sulfide antioxidant being represented by Formula I, II or III:

wherein:

n is an integer of 2 to 15;

m is 1;

R is a substituted or unsubstituted multivalent alkyl group of 2 to 30 carbons, a substituted or unsubstituted multivalent cycloalkyl group of 5 to 20 carbons, a substituted or unsubstituted multivalent alkyl group of 2 to 30 carbons where any of up to 6 carbon atoms are replaced with an O or S heteroatom, a substituted or unsubstituted multivalent cycloalkyl group of 5 to 20 carbons where any of up to 6 carbon atoms are replaced with an O heteroatom, with the proviso that the heteroatoms must be separated from each other and from the portion of the compound to which the R group is bonded by at least one carbon atom, the substituents for R being —OH, SR$^4$ or —OR$^4$, wherein R$^4$ is an alkyl group of 1 to 30 carbons or a cycloalkyl group of 5 to 20 carbons;

R$^1$ and R$^2$ are independently H or an alkyl group of 1 to 4 carbons;

R$^3$ is an alkyl group of 1 to 24 carbons or an cycloalkyl group of 5 to 20 carbons;

R$^5$ is an alkyl group of 1 to 24 carbons;

R$^6$ is H or an alkyl group of 1 to 24 carbons and m=1;

R$^7$ is a direct bond or an alkylene group of 1 to 4 carbons; and

R$^8$ is a monocyclic, bicyclic or tricyclic cycloalkyl group of 5 to 16 carbons.

31. A composition of claim 30, wherein the polycarbonate resin is derived from 2,2-bis(4-hydroxyphenyl)-propane.

32. A composition as in claim 30, wherein the organic sulfide is represented by Formula I or II, wherein R is:

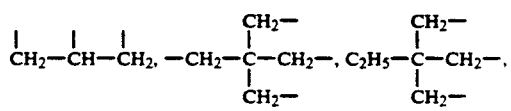

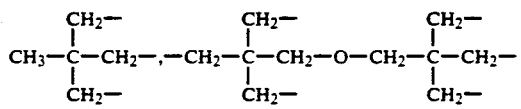

-continued

[structures shown]

wherein ∞ and β are the types of linkages; and wherein:
$R^1$ is H or $CH_3$;
$R^2$ is H; and
$R^3$ is an alkyl group of 10 to 18 carbons.

33. A composition as in claim 32, wherein R is:

[structures shown]

wherein:
$R^1$ and $R^2$ are H; and
$R^3$ is an alkyl group of 12 to 18 carbons.

34. A composition as in claim 30, wherein the organic sulfide is represented by Formula III and has the following structure:

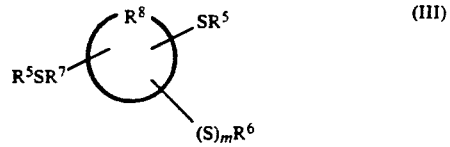

35. A composition as in claim 30, comprising a weight ratio of the organic sulfide to the polycarbonate resin of about 1:10,000 to 1:20.

36. A composition as in claim 35, comprising a weight ratio of the organic sulfide to the polycarbonate resin of about 1:1000 to 1:50.

37. A composition as in claim 30, further comprising an auxiliary thermal stabilizer or light stabilizer.

38. A composition as in claim 37, wherein the auxiliary thermal stabilizer or light stabilizer is selected from the group consisting of hindered phenols, phosphites, organic amines, benzophenones and benzotriazoles.

39. A composition as in claim 30, further comprising polymer additives.

40. A composition as in claim 39, wherein the polymer additives are selected from the group consisting of processing aids, anti-blocking agents, slip agents, flame retardants, smoke suppressants, coupling agents and wetting agents, pigments, fillers and reinforcements.

41. A method for stabilizing a polycarbonate resin comprising adding to the polycarbonate resin an amount of an organic sulfide sufficient to stabilize the polycarbonate resin against oxidative and thermal degradation during processing and use, the organic sulfide antioxidant being represented by Formula I, II or III:

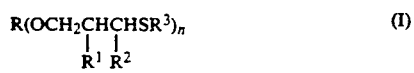

$$\begin{array}{c} R^8 \diagdown \diagup SR^5 \\ R^5SR^7 \diagup \diagdown \\ (S)_m R^6 \end{array} \quad (III)$$

wherein:
m is 1;
n is an integer of 2 to 15;
R is a substituted or unsubstituted multivalent alkyl group of 2 to 30 carbons, a substituted or unsubstituted multivalent cycloalkyl group of 5 to 20 carbons, a substituted or unsubstituted multivalent alkyl group of 2 to 30 carbons where any of up to 6 carbon atoms are replaced with an O or S heteroatom, a substituted or unsubstituted multivalent cycloalkyl group of 5 to 20 carbons where any of up to 6 carbon atoms are replaced with an O heteroatom, with the proviso that the heteroatoms must be separated from each other and from the portion of the compound to which the R group is bonded by at least one carbon atom, the substituents for R being —OH, $SR^4$ or —$OR^4$,
wherein $R^4$ is an alkyl group of 1 to 30 carbons or a cycloalkyl group of 5 to 20 carbons;
$R^1$ and $R^2$ are independently H or an alkyl group of 1 to 4 carbons;
$R^3$ is an alkyl group of 1 to 24 carbons or an cycloalkyl group of 5 to 20 carbons;
$R^5$ is an alkyl group of 1 to 24 carbons;
$R^6$ is H or an alkyl group of 1 to 24 carbons and m=1;
$R^7$ is a direct bond or an alkylene group of 1 to 4 carbons; and R⁸ is a monocyclic, bicyclic or tricyclic cycloalkyl group of 5 to 16 carbons.

42. A method as in claim 41, wherein the organic sulfide is represented by Formula I or II, wherein R is:

$$CH_2-CH-CH_2, -CH_2-\underset{CH_2-}{\overset{CH_2-}{\underset{|}{C}}}-CH_2-, C_2H_5-\underset{CH_2-}{\overset{CH_2-}{\underset{|}{C}}}-CH_2-,$$

$$CH_3-\underset{CH_2-}{\overset{CH_2-}{\underset{|}{C}}}-CH_2-, -CH_2-\underset{CH_2-}{\overset{CH_2-}{\underset{|}{C}}}-CH_2-O-CH_2-\underset{CH_2-}{\overset{CH_2-}{\underset{|}{C}}}-CH_2-$$

$$-CH_2-\underset{CH_2-}{\overset{CH_2-}{\underset{|}{C}}}-CH_2-O-CH_2-\underset{CH_2-}{\overset{CH_2-}{\underset{|}{C}}}-CH_2-O-CH_2-\underset{CH_2-}{\overset{CH_2-}{\underset{|}{C}}}-CH_2-,$$

$$-CH_2-\underset{H}{\overset{H}{\underset{|}{C}}}-\underset{H}{\overset{|}{C}}-\underset{H}{\overset{|}{C}}-CH_2-$$

[cyclic structures with O bridges]

wherein α and β are the types of linkages,
wherein
R¹ is H or CH₃;
R² is H; and
R³ is an alkyl group of 10 to 18 carbons.

43. A method as in claim 42, wherein R is:

$$CH_2-CH-CH_2, -CH_2-\underset{CH_2-}{\overset{CH_2-}{\underset{|}{C}}}-CH_2-, C_2H_5-\underset{CH_2-}{\overset{CH_2-}{\underset{|}{C}}}-CH_2-,$$

$$CH_3-\underset{CH_2-}{\overset{CH_2-}{\underset{|}{C}}}-CH_2-, \text{ and } -CH_2-\underset{H}{\overset{|}{C}}-\underset{H}{\overset{|}{C}}-\underset{H}{\overset{|}{C}}-CH_2-, \text{ or}$$

wherein
R¹ and R² are H; and
R³ is an alkyl group of 12 to 18 carbons.

44. A method as in claim 41, wherein the organic sulfide is represented by Formula III and has the following structure:

[structure with R⁵S—, —SR⁵, —SR⁶ on central tetrahedral carbon]

45. A method as in claim 41, wherein the polycarbonate resin is derived from 2,2-bis(4-hydroxyphenyl)propane.

46. A composition as in claim 30, wherein the organic sulfide is 1,4(5), 8(9) tris(hexadecylthio)cyclo-dodecane.

47. A composition as in claim 30, wherein the organic sulfide is pentaerythritol tetrakis(n-octadecylthio-propyl) ether.

48. A composition as in claim 30, wherein the organic sulfide is pentaerythritol tris(n-octadecylthiopropyl) ether.

49. A composition as in claim 30, wherein the organic sulfide is pentaerythritol tetrakis(n-dodecylthiopropyl) ether.

50. A composition as in claim 30, wherein the organic sulfide is pentaerythritol tris(n-dodecylthiopropyl) ether.

51. A composition as in claim 30, wherein the organic sulfide is trimethylolpropane tris(n-octadecylthiopropyl) ether.

52. A composition as in claim 30, wherein the organic sulfide is dimethylolpropane tris(n-hexyldecylthiopropyl) ether.

53. A composition as in claim 30, wherein the organic sulfide is trimethylolpropane tris(n-octylthiopropyl) ether.

54. A composition as in claim 30, wherein the organic sulfide is dipentaerythritol hexakis(n-dodecylthiopropyl) ether.

55. A composition as in claim 30, wherein the organic sulfide is dipentaerythritol hexakis(n-hexadecylthiopropyl) ether.

56. A composition as in claim 30, in the form of a molded article.

* * * * *

UNITED STATES PATENT AND TRADEMARK OFFICE
CERTIFICATE OF CORRECTION

PATENT NO. : 5,081,169
DATED : January 14, 1992
INVENTOR(S) : Bohen et al.

It is certified that error appears in the above-identified patent and that said Letters Patent is hereby corrected as shown below:

Claim 3, col. 42, line 14, change "$\omega$" to --$\alpha$--.

Claim 13, col. 44, line 45, change "$\infty$" to --$\alpha$--.

Claim 16, col. 45, line 18, change "diethyl" to --dimethyl--.

Claim 16, col. 45, line 26, change "1,4-cyclohexanediamethylene" to --1,4-cyclohexanedimethylene--.

Claim 30, col. 46, line 46, delete "H or".

Claim 32, col. 47, line 37, change "$\infty$" to --$\alpha$--.

Claim 41, col. 48, line 66, delete "H or".

Claim 42, col. 49, line 55, change "$\alpha$" to --$\alpha$--.

Signed and Sealed this

Twenty-sixth Day of October, 1993

Attest:

BRUCE LEHMAN

*Attesting Officer*   *Commissioner of Patents and Trademarks*